United States Patent
Adachi et al.

(10) Patent No.: US 11,210,881 B2
(45) Date of Patent: *Dec. 28, 2021

(54) WIRELESS COMMUNICATION APPARATUS, AUTHENTICATION APPARATUS, WIRELESS COMMUNICATION METHOD AND AUTHENTICATION METHOD

(71) Applicant: KABUSHIKI KAISHA TOSHIBA, Tokyo (JP)

(72) Inventors: Tomoko Adachi, Kawasaki (JP); Seiichiro Horikawa, Yokohama (JP); Koji Akita, Yokohama (JP); Ryoko Matsuo, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/920,837

(22) Filed: Jul. 6, 2020

(65) Prior Publication Data

US 2020/0334932 A1   Oct. 22, 2020

Related U.S. Application Data

(60) Continuation of application No. 16/436,973, filed on Jun. 11, 2019, now Pat. No. 10,771,446, which is a (Continued)

(30) Foreign Application Priority Data

Sep. 4, 2012   (JP) ................................ 2012-194160

(51) Int. Cl.
*G07C 9/27*   (2020.01)
*G07C 9/20*   (2020.01)
(Continued)

(52) U.S. Cl.
CPC ................ *G07C 9/27* (2020.01); *G07C 9/20* (2020.01); *H04L 5/0055* (2013.01); *H04L 63/08* (2013.01); *H04W 12/06* (2013.01); *H04W 84/12* (2013.01)

(58) Field of Classification Search
CPC ...... H04L 63/08; H04L 5/0055; H04W 12/06; H04W 84/12; G07C 9/00103; G07C 9/00007
See application file for complete search history.

(56) References Cited

U.S. PATENT DOCUMENTS

| | | |
|---|---|---|
| 8,897,282 B2 | 11/2014 | Adachi et al. |
| 9,106,330 B2 | 8/2015 | Matsuo et al. |

(Continued)

FOREIGN PATENT DOCUMENTS

| | | |
|---|---|---|
| JP | 2003032176 A | 1/2003 |
| JP | 2006033552 A | 2/2006 |

(Continued)

OTHER PUBLICATIONS

"IEEE Standard for Information technology—Telecommunications and information exchange between systems—Local and metropolitan area networks—Specific requirements—Part 11: Wireless LAN Medium Access Control (MAC) and Physical Layer (PHY) Specification", IEEE Computer Society, IEEE Std 802.11™—2007 (Revision of IEEE Std 802.11-1999), All pages.

(Continued)

*Primary Examiner* — James J Yang
(74) *Attorney, Agent, or Firm* — Holtz, Holtz & Volek PC

(57) ABSTRACT

According to one embodiment, when a control unit is notified of information in at least one second signal received by one of first and second wireless communication units after the control unit provides the second wireless communication unit with a command to transmit a first signal
(Continued)

containing first address information and before a waiting time elapses and when the at least one second signal contains second address information assigned to an authentication apparatus having received the first signal, then the control unit provides the first wireless communication unit with a command to transmit a third signal for a connection request with the second address information set in a destination address.

20 Claims, 15 Drawing Sheets

Related U.S. Application Data continuation of application No. 15/440,148, filed on Feb. 23, 2017, now Pat. No. 10,362,017, which is a division of application No. 14/017,701, filed on Sep. 4, 2013, now Pat. No. 9,613,474.

(51) Int. Cl.
  H04L 5/00 (2006.01)
  H04L 29/06 (2006.01)
  H04W 12/06 (2021.01)
  H04W 84/12 (2009.01)

(56) References Cited

U.S. PATENT DOCUMENTS

| | | | |
|---|---|---|---|
| 9,271,308 B2 | 2/2016 | Adachi et al. | |
| 9,955,439 B2 | 4/2018 | Adachi et al. | |
| 10,575,262 B2 | 2/2020 | Adachi et al. | |
| 2008/0150678 A1* | 6/2008 | Giobbi | G07F 17/3239 340/5.2 |
| 2008/0317039 A1* | 12/2008 | Satterlee | H04L 12/66 370/395.5 |
| 2010/0124937 A1* | 5/2010 | Vogel | G06Q 30/02 455/466 |
| 2012/0077431 A1* | 3/2012 | Fyke | G07C 9/20 455/41.1 |
| 2014/0007209 A1* | 1/2014 | Zucker | H04L 63/06 726/7 |
| 2014/0073247 A1 | 3/2014 | Akita et al. | |
| 2014/0073248 A1 | 3/2014 | Akita et al. | |
| 2015/0271813 A1* | 9/2015 | Kim | H04L 5/0092 370/329 |
| 2020/0154371 A1 | 5/2020 | Adachi et al. | |

FOREIGN PATENT DOCUMENTS

| | | |
|---|---|---|
| JP | 2006166311 A | 6/2006 |
| JP | 2007228241 A | 9/2007 |
| JP | 2008250923 A | 10/2008 |
| JP | 2010066928 A | 3/2010 |
| JP | 2010066929 A | 3/2010 |
| JP | 2010177947 A | 8/2010 |
| JP | 2012118592 A | 6/2012 |

OTHER PUBLICATIONS

Japanese Office Action (and English translation thereof) dated Aug. 25, 2015, issued in counterpart Japanese Application No. 2014-192820.

Related U.S. Appl. No. 16/920,906; First Named Inventor: Tomoko Adachi; Title: "Wireless Communication Apparatus, Authentication Apparatus, Wireless Communication Method and Authentication Method"; filed Jul. 6, 2020.

Related U.S. Appl. No. 16/920,947; First Named Inventor: Tomoko Adachi; Title: "Wireless Communication Apparatus, Authentication Apparatus, Wireless Communication Method and Authentication Method"; filed Jul. 6, 2020.

* cited by examiner

WIRELESS COMMUNICATION APPARATUS, AUTHENTICATION APPARATUS, WIRELESS COMMUNICATION METHOD AND AUTHENTICATION METHOD

CROSS-REFERENCE TO RELATED APPLICATIONS

This is a Continuation of U.S. application Ser. No. 16/436,973, filed Jun. 11, 2019, which is a Continuation of U.S. application Ser. No. 15/440,148, filed Feb. 23, 2017, now U.S. Pat. No. 10,362,017, which is a Divisional application of U.S. application Ser. No. 14/017,701, filed Sep. 4, 2013, now U.S. Pat. No. 9,613,474, which is based upon and claims the benefit of priority from Japanese Patent Application No. 2012-194160, filed Sep. 4, 2012, the entire contents of all of which are incorporated herein by reference.

FIELD

Embodiments described herein relate generally to authentication using wireless communication.

BACKGROUND

At railroad stations or airports, authentication has been carried out using wireless communication, in order to efficiently manage the entry and exit of passengers. When a passenger holds an IC card, a mobile phone with an IC chip, a ticket with a bar code printed thereon, or the like up over an automatic ticket gate, whether or not the passenger is permitted to enter or exit the gate is quickly determined to allow a flap door installed on the automatic ticket gate to open or close.

Furthermore, a technique is known which involves automatic notification, using a second wireless communication scheme, of address information needed for communication based on a first wireless communication scheme. Such a technique allows a communication partner to easily identify the address information compared to the single use of the first wireless communication scheme to make an attempt to establish connection. On the other hand, such a technique may involve unintentional leakage of the address information.

DETAILED DESCRIPTION

Figure 1:
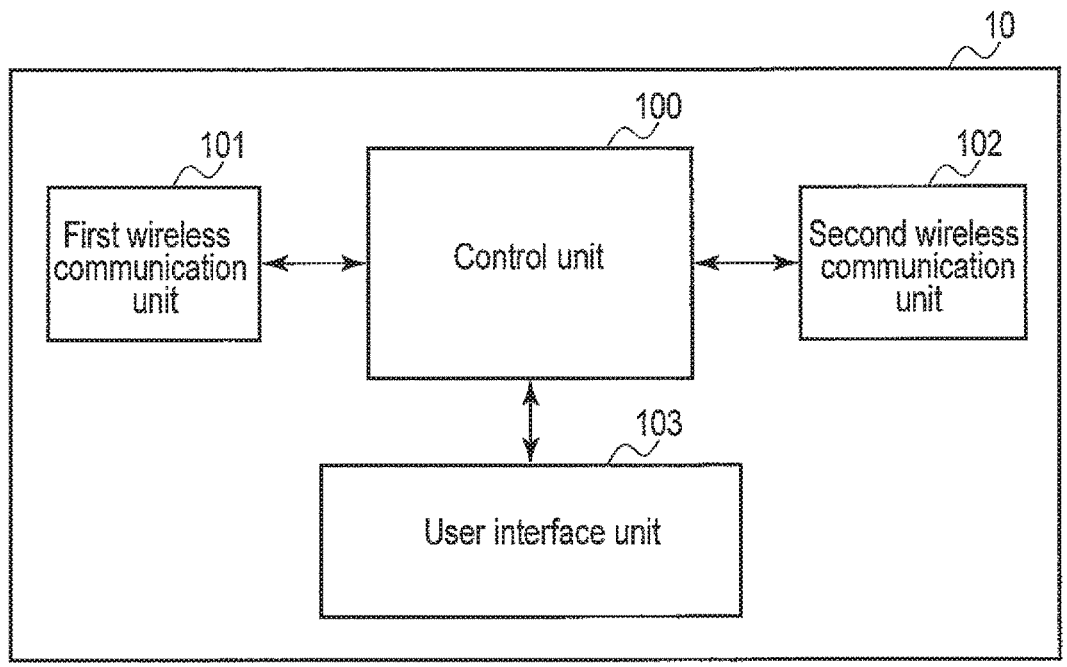
FIG. 1 is a block diagram illustrating a wireless communication apparatus according to a first embodiment.

Embodiments will be described below with reference to the drawings.

In general, according to one embodiment, a wireless communication apparatus includes a first wireless communication unit, a second wireless communication unit and a control unit. The first wireless communication unit performs communication using a first wireless communication scheme. The second wireless communication unit performs communication using a second wireless communication scheme. The control unit controls the first wireless communication unit and the second wireless communication unit. The control unit provides the second wireless communication unit with a command to transmit a first signal containing first address information assigned to the first wireless communication unit, first identification information specifying a desired system and second identification information specifying an authentication target. When the control unit is notified of information in at least one second signal received by either one of the first wireless communication unit and the second wireless communication unit after the control unit provides the second wireless communication unit with the command to transmit the first signal and before a first waiting time elapses and when the at least one second signal contains second address information assigned to an authentication apparatus having received the first signal, then the control unit provides the first wireless communication unit with a command to transmit a third signal for a connection request with the second address information set in a destination address.

In the description below, the term "wireless communication" is broadly interpreted. At least display of image information (for example, a two-dimensional bar code) by one apparatus and reading of the image information by the other apparatus correspond to transmission and reception in "wireless communication". In this example, a communication range can be specified depending on whether or not image information can be successfully read.

Moreover, elements that are the same as or similar to described elements are hereinafter denoted by the same or similar reference numerals, with duplicate descriptions basically omitted.

First Embodiment

As illustrated in FIG. 1, a wireless communication apparatus 10 according to a first embodiment comprises a control unit 100, a first wireless communication unit 101, a second wireless communication unit 102, and a user interface unit 103.

The wireless communication apparatus 10 may comprise a third communication unit not shown in the drawings (for example, a functional unit that carries out radio communication using a public circuit such as a third-generation cellular system). Furthermore, some or all of the functions of the user interface unit 103 described below may be omitted as necessary.

The first wireless communication unit 101 carries out communication based on a first wireless communication scheme. The first wireless communication scheme corresponds to a middle distance communication such as a wireless LAN (Local Area Network) but is not limited to this. In the description below, the first wireless communication scheme is assumed to correspond to the wireless LAN for simplification.

The first wireless communication unit 101 transmits various signals (for example, a frame such as a Probe Request frame, an Association Request frame, and a data frame) in accordance with transmission commands from the control unit 100. Furthermore, the first wireless communication unit 101 receives various signals (for example, a frame such as a Probe Response frame, an Association Response frame, and a data frame) and notifies the control unit 100 of information in the received signals. The first wireless communication unit 101 may comprise a built-in antenna for wireless LAN communication or may be connected to an external antenna.

The second wireless communication unit 102 carries out communication based on a second wireless communication scheme. The second wireless communication scheme corresponds to, for example, communication using a contact IC card or a noncontact IC card or close proximity wireless communication such as NFC (Near Field Communication) that is a next-generation standard for the contact or noncontact IC card but is not limited to this. For example, the second wireless communication scheme may correspond to communication implemented by displaying or reading a bar code (for example, a QR (Quick Response) code). Here, the close proximity wireless communication is interchangeable with, for example, short-distance radio communication or local communication. The second wireless communication scheme typically involves a narrower communication range than the first wireless communication scheme. However, such a relation regarding the communication range is not necessarily required.

The second wireless communication unit 102 transmits signals in accordance with transmission commands from the control unit 100. Furthermore, the second wireless communication unit 102 may receive a certain signal and notify the control unit 100 of information in the received signal. The second wireless communication unit 102 may comprise a built-in antenna or coupler antenna or may be connected to an external antenna or coupler antenna, as necessary. If the second wireless communication scheme corresponds to communication implemented by displaying and reading a bar code, the second wireless communication unit 102 displays the bar code in accordance with a command from the control unit 100.

The control unit 100 controls the first wireless communication unit 101, the second wireless communication unit 102, and the user interface unit 103.

Specifically, in order to control the first wireless communication unit 101, the control unit 100 comprises at least elements corresponding to an application layer and a terminal management entity of a wireless LAN station. According to the IEEE 802.11 wireless LAN standard, the terminal management entity is referred to as an SME (Station Management Entity). The terminal management entity gives commands to a MAC sublayer management entity that manages a media access control (MAC) layer and a PHY sublayer management entity that manages a physical (PHY) layer.

In order to control the first wireless communication unit 101, the control unit 100 may further comprise a MAC sublayer management entity or a PHY sublayer management entity as necessary. According to the IEEE 802.11 wireless LAN standard, the MAC sublayer management entity is referred to as MLME, and the PHY sublayer management entity is referred to as PLME.

Furthermore, in order to control the second wireless communication unit 102, the control unit 100 comprises at least elements corresponding to an application layer based on the second wireless communication scheme. In order to control the second wireless communication unit 102, the control unit 100 may further comprise a terminal management entity, a MAC sublayer management entity, or a PHY sublayer management entity as necessary.

A memory used by the first wireless communication unit 101 may or may not be shared with the control unit 100. Similarly, a memory used by the second wireless communication unit 102 may or may not be shared with the control unit 100. Furthermore, a memory used by the control unit 100 may be provided inside or outside the control unit 100.

The user interface unit 103 notifies a user of information in accordance with a command from the control unit 100. Specifically, the user interface unit 103 can notify the user of the information by, for example, sound, image, vibration, or with a lighting pattern of a light emitting element. Furthermore, the user interface unit 103 acquires information from the user and notifies the control unit 100 of the information. Specifically, the user interface unit 103 can acquire information from the user by, for example, software key operation, hardware key operation, sound, gesture, or image.

Figure 2:
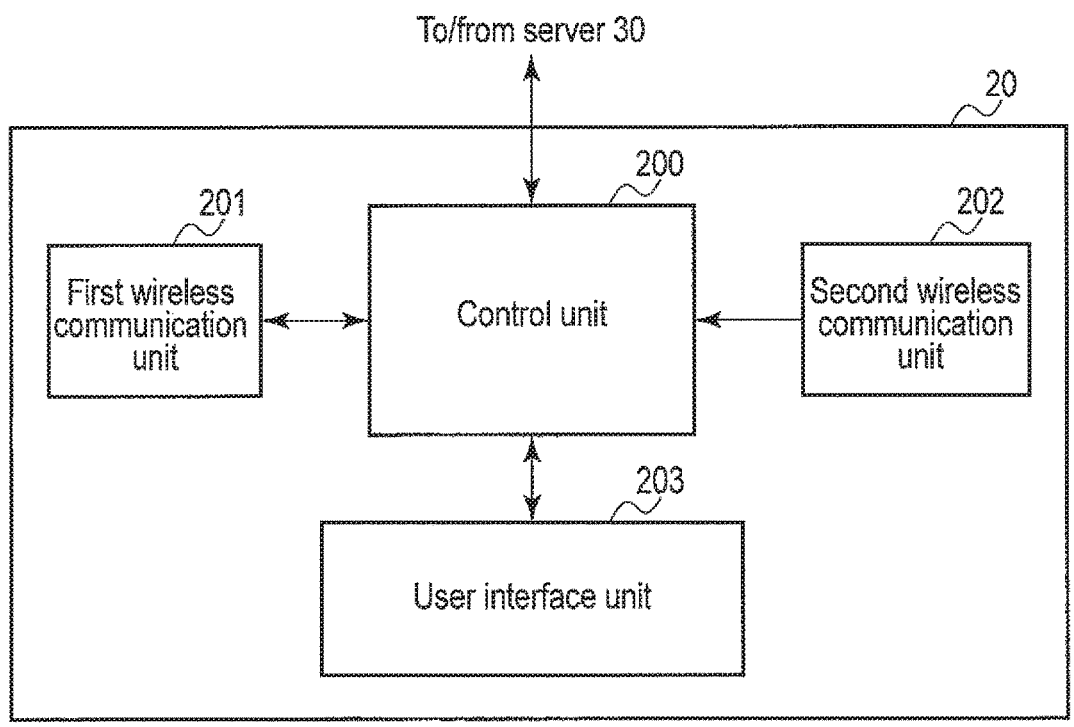
FIG. 2 is a block diagram illustrating an authentication apparatus according to the first embodiment.

As illustrated in FIG. 2, the authentication apparatus 20 according to the first embodiment comprises a control unit 200, a first wireless communication unit 201, a second wireless communication unit 202, and a user interface unit 203. The authentication apparatus 20 carries out authentication using wireless communication and may thus be referred to as a wireless communication apparatus 20.

The authentication apparatus 20 corresponds to an automatic ticket gate (or a passage control apparatus) which controls the entry and exit of passengers at a railroad station or an airport but is not limited to this. In the description below, the authentication apparatus 20 is assumed to correspond to an automatic ticket gate for clarification.

The authentication apparatus 20 may comprise a third communication unit (for example, a functional unit that carries out radio communication using a public circuit such as a third-generation cellular system). Furthermore, some or all of the functions of the user interface unit 203 described below may be omitted as necessary.

The first wireless communication unit 201 carries out communication based on the first wireless communication scheme. The first wireless communication unit 201 transmits various signals (for example, a frame such as a Probe Response frame, an Association Response frame, and a data frame) in accordance with transmission commands from the control unit 200. Furthermore, the first wireless communication unit 201 receives various signals (for example, a frame such as a Probe Request frame, an Association Request frame, and a data frame) and notifies the control unit 200 of information in the received signals. The first wireless communication unit 201 may comprise a built-in antenna for wireless LAN communication or may be connected to an external antenna.

The second wireless communication unit 202 carries out communication based on the second wireless communication scheme. The second wireless communication unit 202 may receive a signal described below and notify the control unit 200 of information in the received signal. The second wireless communication unit 202 may transmit a certain signal in accordance with a transmission command from the control unit 200. The second wireless communication unit 202 may comprise a built-in antenna or coupler antenna or may be connected to an external antenna or coupler antenna, as necessary. If the second wireless communication scheme corresponds to communication implemented by displaying and reading a bar code, the second wireless communication unit 202 corresponds to a bar code reader.

The control unit 200 controls the first wireless communication unit 201, the second wireless communication unit 202, and the user interface unit 203. Moreover, the control unit 200 can communicate directly or indirectly with a server 30 (not shown in the drawings).

Specifically, in order to control the first wireless communication unit 201, the control unit 200 comprises at least elements corresponding to an application layer and a terminal management entity of a wireless LAN station (access point). In order to control the first wireless communication unit 201, the control unit 200 may further comprise a MAC sublayer management entity or a PHY sublayer management entity as necessary.

Furthermore, in order to control the second wireless communication unit 202, the control unit 200 comprises at least elements corresponding to the application layer based on the second wireless communication scheme. In order to control the second wireless communication unit 202, the control unit 200 may further comprise a terminal management entity, a MAC sublayer management entity, or a PHY sublayer management entity as necessary.

A memory used by the first wireless communication unit 201 may or may not be shared with the control unit 100. Similarly, a memory used by the second wireless communication unit 202 may or may not be shared with the control unit 200. Furthermore, a memory used by the control unit 200 may be provided inside or outside the control unit 200.

Moreover, the control unit 200 can acquire, from the server 30, information necessary for authentication over wireless communication. Examples of the information include identification information (for example, an SSID (Service Set Identifier)) assigned to the whole wireless communication system formed of one or more authentication apparatuses including the authentication apparatus 20, and identification information (for example, a reservation ID and/or ticket information described below) which allows an authentication target to be identified. The SSID is identification information assigned by a system administrator to the whole IEEE 802.11 wireless LAN system operated by the system administrator. Information identifying the authentication target is provided to the wireless communication apparatus 10 beforehand (for example, when a ticket is purchased).

The user interface unit 203 notifies the user of information in accordance with a command from the control unit 200. Specifically, the user interface unit 203 can output information to the user by, for example, sound, image, vibration, or with a lighting pattern of a light emitting element. Furthermore, the user interface unit 203 acquires information from the user and notifies the control unit 200 of the information. Specifically, the user interface unit 203 can acquire information from the user by, for example, software key operation, hardware key operation, sound, gesture, or image.

In particular, if the authentication apparatus 20 corresponds to an automatic ticket gate, the user interface unit 203 may comprise a flap door that opens or closes depending on whether or not the passenger is permitted to enter or exit the gate (i.e., an authentication result for an SSID, a reservation ID, or ticket information received from the wireless communication apparatus 10). Furthermore, the user interface unit 203 may display an image or output a sound in order to allow the passenger to recognize whether or not the passenger is permitted to enter or exit the gate.

The description below assumes a use case where the wireless communication apparatus 10 executes a certain application to behave as a ticket (for example, a limited express ticket, a railroad ticket, or an air ticket) corresponding to an authentication target and where the user carrying the wireless communication apparatus 10 passes through the authentication apparatus 20 corresponding to an automatic ticket gate.

It is assumed that the user has already purchased a ticket and that identification information necessary to pass through the authentication apparatus 20 has been saved in the wireless communication apparatus 10 via the server 30. The information includes, for example, an SSID assigned to the whole wireless LAN system formed of one or more authentication apparatuses (typically, a plurality of adjacently disposed automatic ticket gates) including the authentication apparatus 20. Moreover, the information includes a reservation ID corresponding to identification information uniquely assigned to a ticket (i.e., an authentication target) and ticket information indicative of details of the ticket (i.e., the authentication target) specified by the reservation ID.

The SSID may be changed, for example, every day or at every time period. In such a case, the SSID corresponding to the date and time when the ticket is scheduled to be used are saved by the wireless communication apparatus 10. When the SSID is fixed, the following problem, for example, may occur.

An SSID previously saved to allow the corresponding ticket to be used may remain undeleted even after the use of the ticket, and the wireless communication apparatus 10 may enter a wireless LAN area provided by the authentication apparatus 20. In this case, the wireless communication apparatus 10 may recognize the authentication apparatus 20 as a normal wireless LAN access point (base station) and attempt to connect to the authentication apparatus 20 for wireless LAN communication. The ticket associated with the SSID has already been used, and thus the wireless communication apparatus 10 cannot connect to the authentication apparatus 20. However, during the attempt to make connection, useless frames are exchanged with one another. The exchange of useless frames may consume communication capacity, which prevents other users from using appropriate tickets (for example, a time needed for authentication may be increased).

Such problems can be avoided by appropriately designing the wireless communication apparatus 10. Specifically, the wireless communication apparatus 10 may delete the SSID temporarily saved to use the ticket, after the use of the ticket.

The authentication apparatus 20 acquires the SSID from the server 30, for example, every day or at every time period and hold the SSID. Moreover, the authentication apparatus 20 acquires a plurality of acceptable reservation IDs, for example, every day or at every time period and holds the plurality of acceptable reservation IDs. If the communication between the authentication apparatus 20 and the server 30 is sufficiently fast, the communication only insignificantly affects a time required to authenticate the wireless communication apparatus 10. Thus, the authentication apparatus 20 may inquire, in real time, of the server 30 whether or not the reservation ID received from the wireless communication apparatus 10 is acceptable.

Figure 3:
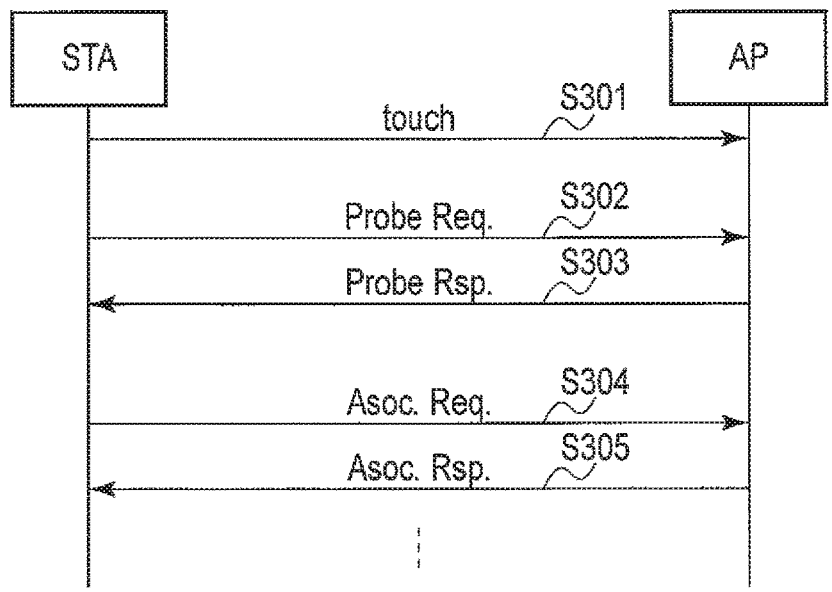
FIG. 3 is a diagram illustrating signals exchanged between the wireless communication apparatus and the authentication apparatus according to the first embodiment.

FIG. 3 illustrates signals exchanged between the wireless communication apparatus 10 and the authentication apparatus 20 according to the present embodiment. In FIG. 3, STA is an abbreviation for "station" and represents the wireless communication apparatus 10. Similarly, AP is an abbreviation for "access point" and represents the authentication apparatus 20.

First, for example, the user operates the user interface unit 103 of the wireless communication apparatus 10 to execute a certain application in the control unit 100 of the wireless communication apparatus 10. The application may be executed based on a condition different from the user operation. Specifically, the application may be executed on the condition that the wireless communication apparatus 10 has entered a communication area based on the second wireless communication scheme provided by the authentication apparatus 20.

When the application is executed, the control unit 100 provides the second wireless communication unit 102 with a command to transmit a signal (S301). The signal (S301) contains the SSID, the reservation ID, and address information assigned to the first wireless communication unit 101. The signal (S301) is received by the second wireless communication unit 202.

The address information assigned to the first wireless communication unit 101 is, for example, a MAC address used by the first wireless communication unit 101. The MAC address means the address of a MAC entity used in a wireless LAN system and is designated as a source address of a frame transmitted by the first wireless communication unit 101. The source address is also referred to as a TA (transmitter address or transmitting STA address).

The second wireless communication unit 202 notifies the control unit 200 of information in the signal (S301). The control unit 200 checks the signal (S301) for consistency. Specifically, the control unit 200 determines whether or not the SSID contained in the signal (S301) matches the SSID designated by the server 30. Moreover, the control unit 200 determines whether or not the reservation ID contained in the signal (S301) matches any of the plurality of acceptable reservation IDs designated by the server 30. If both the SSID and reservation ID contained in the signal (S301) are appropriate, the authentication apparatus 20 continues the authentication process. On the other hand, if at least one of the SSID and reservation ID contained in the signal (S301) is inappropriate, the authentication apparatus 20 discontinues the authentication process (rejects authentication), and for example, closes the flap door and displays an image indicating that the passage is rejected.

After the transmission of the signal (S301), the control unit 100 provides the first wireless communication unit 101 a command to transmit a signal (S302) for scanning a wireless LAN system formed by the authentication apparatus 20. The signal (S302) is referred to as a Probe Request frame according to the IEEE 802.11 wireless LAN standard. The Probe Request frame is a type of management frame which is included in MAC frames.

According to the IEEE 802.11 wireless LAN standard, a MAC frame generally contains a MAC header, a frame body, and an FCS (Frame Check Sequence). The MAC header of the Probe Request frame contains, for example, a destination address field, a source address field, and a BSSID field. According to the IEEE 802.11 wireless LAN standard, the destination address is also referred to as the DA. According to the IEEE 802.11 wireless LAN standard, the source address is also referred to as the SA. However, in the management frame, the SA is generally equal to the TA, described above.

Figure 4:
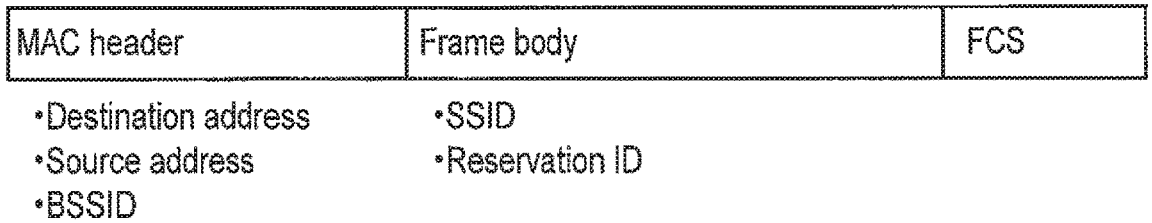
FIG. 4 is a diagram illustrating a format of a Probe Request frame.

FIG. 4 illustrates the format of the Probe Request frame (S302). According to the format in FIG. 4, the control unit 100 needs to set a destination address field, a source address field, and a BSSID field in the MAC header, and to set an SSID and a reservation ID in the frame body.

In general, it is difficult to identify, at the time of the purchase of the ticket, the authentication apparatus 20 through which the user is to pass using the ticket. Hence, the control unit 100 may set a broadcast address in the destination address field of the Probe Request frame (S302). The broadcast address means an address that does not specify any destination. A frame with a broadcast address set in the destination address is referred to as a broadcast frame.

If the authentication apparatus 20 through which the user passes using the ticket can be identified at the time of the purchase of the ticket, the control unit 100 may set address information (typically a MAC address) assigned to the first wireless communication unit 201 of the authentication apparatus 20, in the destination address field of the Probe Request frame (S302). The address information may be acquired together with the SSID and the reservation ID or at the time of the installation of the above-described application.

The control unit 100 sets the source address field of the Probe Request frame (S302) to the MAC address of the first wireless communication unit 101 which was also contained in the signal (S301).

According to the IEEE 802.11 wireless LAN standard, in general, the MAC address of an access point is equal to the BSSID. That is, if the destination address is not specified, the BSSID is also not specified. Hence, the control unit 100 may set a wildcard BSSID in the BSSID field of the Probe Request frame (S302). According to the IEEE 802.11 wireless LAN standard, setting the BSSID field to the wildcard BSSID means designating no particular BSSID, or in other words, covering all BSSIDs.

If the authentication apparatus 20 through which the user passes using the ticket can be identified at the time of the purchase of the ticket, the control unit 100 may set the BSSID field of the Probe Request frame (S302) to the MAC address of the first wireless communication unit 201 of the authentication apparatus 20.

Here, the BSSID is identification information allowing identification of a BSS (Basic Service Set) corresponding to a subgroup of a wireless LAN communication system specified by the above-described SSID. The BSS means, for example, a group formed of one access point and one or more wireless communication apparatuses connected to the access point. In other words, the BSS means a group formed of a plurality of wireless communication apparatuses (including an access point) which use synchronized timers. According to the IEEE 802.11 wireless LAN standard, the BSSID identifying a BSS which is formed centering on an access point, i.e., an infrastructure BSS, is equal to the MAC address of the access point.

The control unit 100 sets an SSID in the frame body of the Probe Request frame (S302), in the same way as the general Probe Request frame. Moreover, the control unit 100 sets a reservation ID in the frame body of the Probe Request frame (S302). The SSID and the reservation ID are the same with the SSID and the reservation ID contained in the signal (S301).

The IEEE 802.11 wireless LAN standard provides an IE (Information Element) to allow various pieces of information to be set in the frame body of a management frame. The IE contains an Element ID field, a Length field, and an Information field. Information indicative of the type of the IE is set in the Element ID field. Information indicative of the length of the Information field is set in the Length field. Desired information is set in the Information field. Moreover, the IEEE 802.11 wireless LAN standard provides a vender specific IE that is a type of IE. Thus, the control unit 100 may use the vender specific IE to notify a reservation ID. Alternatively, a new Element ID value may be defined to allow a reservation ID to be notified.

The Probe Request frame (S302) is received by the first wireless communication unit 201. The first wireless communication unit 201 determines whether or not the destination address in the Probe Request frame (S302) is appropriate. The appropriate destination address means that the value set in the destination address matches the MAC address of the first wireless communication unit 201. Here, the MAC address of the first wireless communication unit 201 itself and the broadcast address match the MAC address of the first wireless communication unit 201. If the destination address in the Probe Request frame (S302) is appropriate, the first wireless communication unit 201 continues the reception process. The first wireless communication unit 201 notifies the control unit 200 of the information in the Probe Request frame (S302).

The control unit 200 checks the Probe Request frame (S302) for its consistency. Specifically, the control unit 200 determines whether or not the value set in the source address field of the Probe Request frame (S302) matches the MAC address of the first wireless communication unit 101 contained in the signal (S301). Moreover, the control unit 200 determines whether or not the SSID and reservation ID set in the frame body of the Probe Request frame (S302) match the SSID and reservation ID contained in the signal (S301) (in other words, the SSID and reservation ID acquired from the server 30). If the source address, SSID, and reservation ID contained in the Probe Request frame (S302) match the source address, SSID, and reservation ID contained in the signal (S301), respectively, the control unit 200 provides the first wireless communication unit 201 with a command to transmit a signal (S303) for a response to the Probe Request frame (S302). On the other hand, if at least one of the source address, SSID, and reservation ID contained in the Probe Request frame (S302) fails to match the corresponding one of the source address, SSID, and reservation ID contained in the signal (S301), the control unit 200 does not provide the first wireless communication unit 201 with the command to transmit the signal (S303).

The control unit 200 may check the BSSID in addition to the source address, the SSID, and the reservation ID. Specifically, the control unit 200 determines whether or not the BSSID contained in the Probe Request frame (S302) is equal to a desired value. For example, it is assumed that a wildcard BSSID is expected to be set in the BSSID in the Probe Request frame (S302). Under this assumption, if a value other than the wild card BSSID is set in the BSSID, the control unit 200 does not provide the first wireless communication unit 201 with the command to transmit the signal (S303).

The signal (S303) is referred to as a Probe Response frame according to the IEEE 802.11 wireless LAN standard. The Probe Response frame (S303) is a type of management frame included in the MAC frames.

Figure 5:
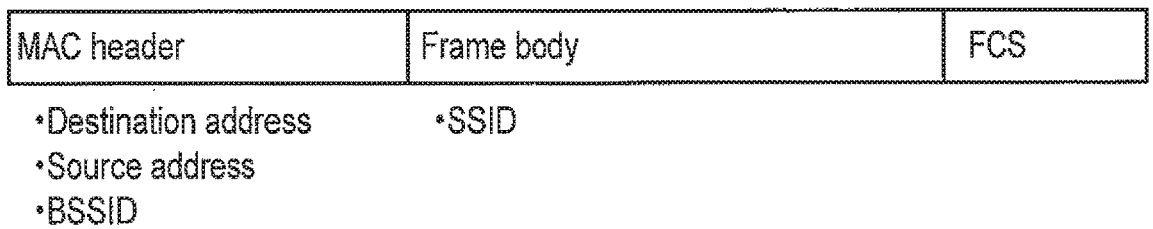
FIG. 5 is a diagram illustrating the format of a Probe Response frame.

FIG. 5 illustrates the format of the Probe Response frame (S303). According to the format in FIG. 5, the control unit 200 needs to set a destination address, a source address, and a BSSID in the MAC header and to set an SSID in the frame body.

The control unit 200 sets the MAC address of the first wireless communication unit 101 in the destination address field of the Probe Response frame (S303). The MAC address of the first wireless communication unit 101 can be acquired from the Probe Request frame (S302) and the signal (S301).

The control unit 200 sets the MAC address of the first wireless communication unit 201 in the source address field of the Probe Response frame (S303). When the authentication apparatus 20 is assumed to form an infrastructure BSS as described above, the BSSID of the infrastructure BSS matches the MAC address of the first wireless communication unit 201. Hence, the control unit 200 sets the MAC address of the first wireless communication unit 201 in the BSSID field of the Probe Response frame (S303).

The control unit 200 sets an SSID in the frame body of the Probe Response frame (S303). The SSID can be acquired from the server 30, from the Probe Request frame (S302), and from the signal (S301). To allow the wireless communication apparatus 10 to reconfirm that the authentication apparatus 20 is a wireless LAN access point set to handle the tickets, the control unit 200 may further set a reservation ID in the frame body of the Probe Response frame (S303). The reservation ID can be acquired from the server 30, from the Probe Request frame (S302), and from the signal (S301).

The Probe Response frame (S303) is received by the first wireless communication unit 101. The first wireless communication unit 101 determines whether or not the destination address in the Probe Response frame (S303) is appropriate. The appropriate destination address means that the value set in the destination address matches the MAC address of the first wireless communication unit 101. If the destination address in the Probe Response frame (S303) is appropriate, the first wireless communication unit 101 continues the reception process. The first wireless communication unit 201 notifies the control unit 100 of the information in the Probe Response frame (S303).

When notified of the information in the Probe Response frame (S303), the control unit 100 provides the first wireless communication unit 101 with a command to transmit a signal (S304) for a request for connection to a wireless LAN system formed by the authentication apparatus 20.

The signal (304) is referred to as an Association Request frame according to the IEEE 802.11 wireless LAN standard. The Association Request frame is a type of management frame included in the MAC frames.

The format of the Association Request frame (S304) is similar to the formats of the Probe Request frame (S302) and the Probe Response frame (S303) (that is, the formats shown in FIG. 4 and FIG. 5). Specifically, the control unit 100 needs to set a destination address, a source address, and a BSSID in the MAC header and to set an SSID in the frame body. The frame format of the Association Request frame (S304) may be designed to allow a reservation ID to be further set in the frame body.

The control unit 100 sets the MAC address of the first wireless communication unit 201 in the destination address field and BSSID field of the Association Request frame (S304). The MAC address of the first wireless communication unit 201 can be acquired from the Probe Response frame (S303).

The control unit 100 sets the MAC address of the first wireless communication unit 101 in the source address field of the Association Request frame (S304). The control unit 100 sets an SSID in the frame body of the Association Request frame (S304). The SSID can be acquired from the server 30 (at the time of the purchase of the ticket) and from the Probe Response frame (S303).

The Association Request frame (S304) is received by the first wireless communication unit 201. The first wireless communication unit 201 determines whether or not the destination address in the Association Request frame (S304) is appropriate. If the destination address in the Association Request frame (S304) is appropriate, the first wireless communication unit 201 continues the reception process. The first wireless communication unit 201 notifies the control unit 200 of the information in the Association Request frame (S304).

The control unit 200 checks the Association Request frame (S304) for its consistency. Specifically, the control unit 200 determines whether or not the value set in the source address field of the Association Request frame (S304) matches the MAC address of the first wireless communication unit 101 contained in the Probe Request frame (S302). The control unit 200 then provides the first wireless communication unit 201 with a command to transmit a signal (S305) for a response to the Association Request frame (S304).

A value indicating whether the connection request is to be accepted or rejected based on the Association Request frame (S304) is set in the signal (S305). Specifically, if the value set in the source address field of the Association Request frame (S304) matches the MAC address of the first wireless communication unit 101 contained in the Probe Request frame (S302), the control unit 200 sets a value indicating that the connection request is to be accepted, in the signal (S305). On the other hand, if the value set in the source address field of the Association Request frame (S304) fails to match the MAC address of the first wireless communication unit 101 contained in the Probe Request frame (S302), the control unit 200 sets a value indicating that the connection request is to be rejected, in the signal (S305).

The control unit 200 may determine whether the connection request is to be accepted or rejected based on the consistency of the SSID in addition to the source address. For example, if the SSID set in the frame body of the Association Request frame (S304) fails to match the SSID contained in the Probe Request frame (S302), the control unit 200 may set the value indicating that the connection request is to be rejected, in the signal (S305). Furthermore, the control unit 200 may determine whether the connection request is to be accepted or rejected based on the consistency of the reservation ID in addition to the source address. For example, if the reservation ID set in the frame body of the Association Request frame (S304) fails to match the reservation ID contained in the Probe Request frame (S302), the control unit 200 may set the value indicating that the connection request is to be rejected, in the signal (S305).

The signal (S305) is referred to as an Association Response frame according to the IEEE 802.11 wireless LAN standard. The Association Response frame is a type of management frame included in the MAC frames.

The format of the Association Response frame (S305) is similar to the above-described formats of the Probe Request frame (S302) and the Probe Response frame (S303) (that is, the formats illustrated in FIG. 4 and FIG. 5). Specifically, the control unit 200 needs to set a destination address, a source address, and a BSSID in the MAC header and to set a value indicating whether the connection request is to be accepted or rejected, in a status code field carried in the frame body.

The control unit 200 sets the MAC address of the first wireless communication unit 101 in the destination address field of the Association Response frame (S305). The MAC address of the first wireless communication unit 101 can be acquired from the Association Request frame (S304), the Probe Request frame (S302), and the signal (S301).

The control unit 200 sets the MAC address of the first wireless communication unit 201 in the source address field and BSSID field of the Association Response frame (S305). The control unit 200 sets the value indicating whether the connection request is to be accepted or rejected, in the status code field carried in the frame body of the Association Response frame (S305). For example, if the connection request is to be accepted, the control unit 200 sets "0" (that is, successful) in the status code field. If the connection request is to be rejected, the control unit 200 sets a value other than "0" in the status code field. A new status code value indicating that the connection request is to be rejected may be defined.

The Association Response frame (S305) is received by the first wireless communication unit 101. The first wireless communication unit 101 determines whether or not the destination address in the Association Response frame (S305) is appropriate. If the destination address in the Association Response frame (S305) is appropriate, the first wireless communication unit 101 continues the reception process. The first wireless communication unit 101 notifies the control unit 100 of the information in the Association Response frame (S305).

The control unit 100 determines whether the connection request is accepted or rejected based on the status code in the Association Response frame (S305). If the connection request is accepted, exchange of data frames is started between the wireless communication apparatus 10 and the authentication apparatus 20 via the wireless LAN.

The control unit 100 may provide the first wireless communication unit 101 with a command to transmit an acknowledgement to the Association Response frame (S305) as necessary. Then, the control unit 200 may start the exchange of data frames after the acknowledgement is received via the first wireless communication unit 201 or after the control unit 200 is notified that the transmission of the Association Response frame (S305) is completed based on the reception of the acknowledgement.

Furthermore, security may be set before the exchange of data frames based on data generated in the application layer. The security may be set after the Association Request frame (S304) and the Association Response frame (S305) are exchanged. A certain type of security is set through the exchange of data frames at the MAC layer level of the wireless LAN.

Alternatively, various signals (that is, the signal (S301) to the frame (S305)) exchanged between the wireless communication apparatus 10 and the authentication apparatus 20 may contain information required to set the security. The wireless communication apparatus 10 and the authentication apparatus 20 can set the security based on the information contained in the received signals.

After the exchange of data frames is started, the control unit 100 provides the first wireless communication unit 101 with a command to transmit a data frame containing ticket information indicative of the details of the ticket to be used (for example, purchase information and passenger ticket information).

The first wireless communication unit 201 receives the data frame containing the ticket information, and notifies the control unit 200 of the information in the received data frame. The control unit 200 determines whether or not the ticket information contained in the received data frame is appropriate. The control unit 200 provides the first wireless communication unit 201 with a command to transmit a data frame containing a value indicative of a determination result (that is, information indicating whether or not the ticket information is successfully authenticated). Moreover, the control unit 200 may transmit the ticket information and the value indicative of the determination result to the server 30 as entry and exit management information on the user of the wireless communication apparatus 10.

Furthermore, the control unit 200 controls the user interface unit 203 in accordance with the determination result. For example, if the ticket information is appropriate, the user interface unit 203 opens the flap door and displays an image indicating that passage is accepted. On the other hand, if the ticket information is not appropriate, the user interface unit 203 closes the flap door and displays an image indicating that the passage is rejected. That is, the authentication apparatus 20 uses the ticket information as a piece of authentication information to also achieve authentication at the level of data frame exchange.

The first wireless communication unit 101 receives the data frame containing the determination result and notifies the control unit 100 of the information in the received data frame. The control unit 100 may notify the user of the determination result via the user interface unit 103. Furthermore, the control unit 100 may save a value indicative of the determination result to the memory in association with the ticket information.

The exchange of data frames may be utilized not only for the above-described authentication but also to distribute contents or advertisements. Specifically, even after the user of the wireless communication apparatus 10 passes through the authentication apparatus 20, the user is not immediately disconnected from the wireless LAN, and thus the authentication apparatus 20 can provide service to the user utilizing an excess communication capacity.

The details of operation of the control unit 100 provided in the wireless communication apparatus 10 according to the present embodiment can be described using a specification and description language (SDL) as illustrated in FIG. 6A, FIG. 6B, FIG. 6C, and FIG. 6D.

In the description below, it is assumed that the terminal management entity provided in the control unit 100 gives commands to the MAC sublayer management entity to allow the first wireless communication unit 101 to be controlled.

In the example illustrated in FIG. 6A, FIG. 6B, FIG. 6C, and FIG. 6D, it is assumed that the second wireless communication scheme does not provide a mechanism for directly confirming that communication is completed. For example, the second wireless communication scheme corresponds to communication implemented by displaying and reading a bar code. However, when notified of the information in the Probe Response frame from the appropriate access point, the control unit 100 can indirectly confirm that the communication based on the second wireless communication scheme is completed.

Figure 6A:
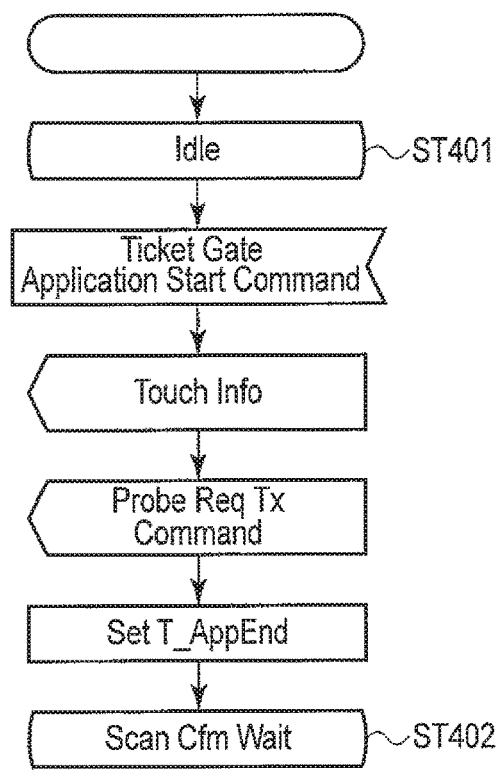
FIG. 6A is a diagram illustrating operation of a control unit of the wireless communication apparatus according to the first embodiment.

FIG. 6A shows inputs to and outputs from the control unit 100 and internal processing by the control unit 100 during transition from an Idle state (ST401) to a Scan Cfm Wait state (ST402).

FIG. 6A shows a process start symbol. In the SDL, the process start symbol is used to represent the start of the process. That is, as shown in FIG. 6A, when the process is started, the control unit 100 shifts to the Idle state (ST401). The process start symbol drawn in other drawings has a similar meaning.

In the Idle state (ST401), for example, the control unit 100 is notified of a command to start an application (a Ticket Gate Application Start command in FIG. 6A) based on an operation on the user interface unit 203. The control unit 100 provides the second wireless communication unit 102 with a command to transmit a signal (Touch Info in FIG. 6A). Touch Info includes an SSID, a reservation ID, and the MAC address of the first wireless communication unit 101.

Moreover, the control unit 100 provides the first wireless communication unit 101 with a command to transmit the Probe Request frame (a Probe Req Tx command in FIG. 6A). The control unit 100 sets the maximum time for waiting for the Probe Response frame in a timer (T_AppEnd in FIG. 6A), and shifts to the Scan Cfm Wait state (ST402).

The Probe Request frame may be iteratively transmitted at least twice. For example, the control unit 100 iteratively provides the first wireless communication unit 101 with a command to transmit the Probe Request frame.

Figure 6B:
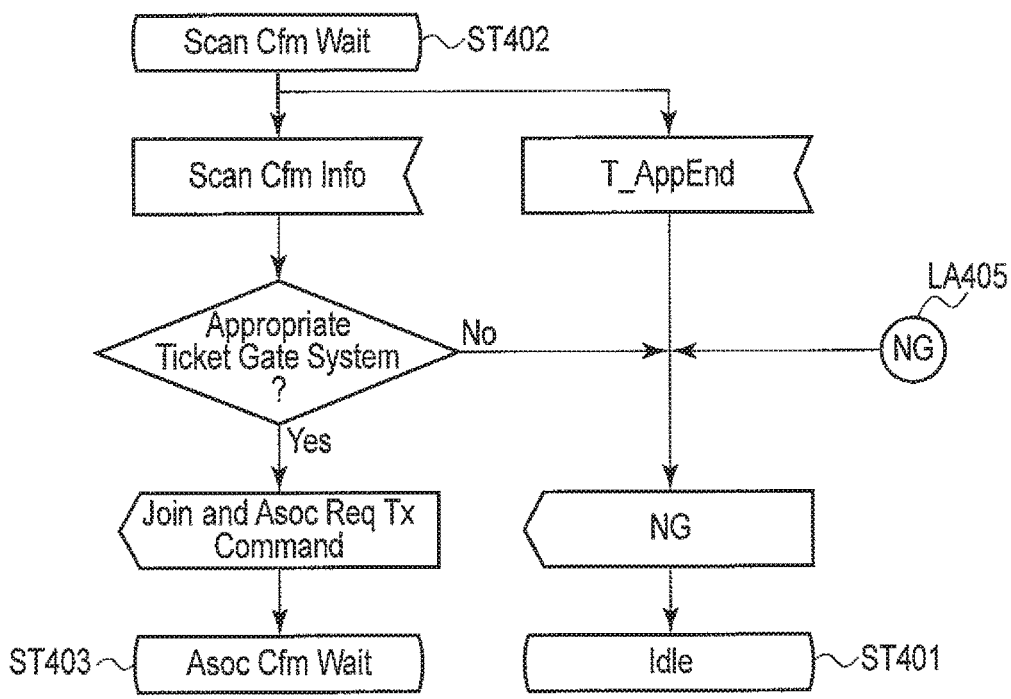
FIG. 6B is a diagram illustrating operation of the control unit of the wireless communication apparatus according to the first embodiment.

FIG. 6B shows inputs to and outputs from the control unit 100 during a transition of the control unit 100 from the Scan Cfm Wait state (ST402) to an Asoc Cfm Wait state (ST403) or the Idle state (ST401). Moreover, FIG. 6B shows an output from the control unit 100 during a transition of the control unit 100 from an NG label (LA405) to the Idle state (ST401).

In the Scan Cfm Wait state (ST402), the control unit 100 waits to be notified, by the first wireless communication unit 101, of the information of a scan result including the information extracted from a Probe Response frame if the Probe Response frame is received (Scan Cfm Info in FIG. 6B).

In general, the maximum time to spend on each channel when scanning is set in the command (corresponding to an MLME-SCAN.request primitive according to the IEEE 802.11 wireless LAN standard) to transmit the Probe Request frame. The wireless communication unit 101 waits to collect Probe Response frames on each of the channels, which are also specified in the command, until the maximum time elapses. The channels to be scanned may be provided to the wireless communication apparatus 10 beforehand (for example, when a ticket is purchased). For a fast connection setup, it may be desirable to limit the number of channels to be scanned as possible, such as to one. Even if the maximum time elapses before the wireless communication unit 101 receives no Probe Response frames on the channel, the wireless communication unit 101 needs to change to the next specified channel. And finally, even if there were no Probe Response frames received on any of the specified channels, the wireless communication unit 101 needs to notify the control unit 100 of information indicative of receiving no Probe Response frames. That is, regardless of whether or not receiving a Probe Response frame, the wireless communication unit 101 notifies the control unit 100 of information concerning the scan result (Scan Cfm Info in FIG. 6B; corresponding to an MLME-SCAN.confirm primitive according to the IEEE 802.11 wireless LAN standard).

When notified of Scan Cfm Info, the control unit 100 determines whether or not the Probe Response frame has been received from the appropriate access point (authentication apparatus 20). If the Probe Response frame has been received from the appropriate access point, the control unit 100 provides the first wireless communication unit 101 with commands to synchronize with a BSS specified by a BSSID equal to the MAC address of the access point and to transmit the Association Request frame to the access point (a Join and Asoc Req Tx command in FIG. 6B). The control unit 100 then shifts to the Asoc Cfm Wait state (ST403).

In FIG. 6B, the synchronization command and the command to transmit the Association Request frame appear to be simultaneously provided to the first wireless communication unit 101. However, strictly speaking, the control unit 100 provides the synchronization command to the first wireless communication unit 101, and after being notified of information indicating that the synchronization is completed, provides the first wireless communication unit 101 with a command to transmit the Association Request frame.

Here, the synchronization means a process of synchronizing a timer of the first wireless communication unit 101 with a timer of the BSS specified by the designated BSSID. The value of the timer of the BSS is contained in a Beacon frame or the Probe Response frame transmitted by the access point forming the BSS. Specifically, according to the IEEE 802.11 wireless LAN standard, the timer value is set in a Timestamp field of these frames.

If the access point has transmitted the Beacon frame, the control unit 101 may receive the Beacon frame and synthesize with the BSS based on the timer value contained in the received Beacon frame. On the other hand, if the access point has not transmitted the Beacon frame, the control unit 100 may provide the first wireless communication unit 101 with a command to transmit the Probe Request frame again in order to urge the access point to transmit the Probe Response frame. The first wireless communication unit 101 may receive the Probe Response frame and synchronize with the BSS based on the timer value contained in the received Probe Response frame.

At the NG label (LA405), the control unit 100 notifies the user of information indicative of authentication rejection on the application (NG in FIG. 6B) via the user interface unit 103 and then shifts to the Idle state (ST401). If the timer (T_AppEnd in FIG. 6B) times out without notification of Scan Cfm Info from the first wireless communication unit 101 or the Probe Response frame has not been received from the appropriate access point, the control unit 100 performs an operation that is the same as or similar to the operation performed at the NG label (LA405).

Figure 6C:
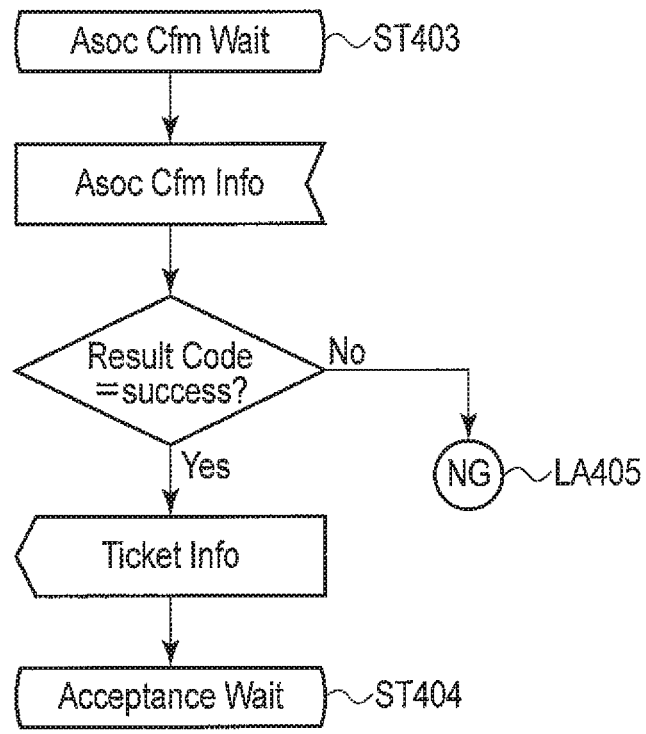
FIG. 6C is a diagram illustrating operation of the control unit of the wireless communication apparatus according to the first embodiment.

FIG. 6C shows inputs to and outputs from the control unit 100 during a transition of the control unit 100 from the Asoc Cfm Wait state (ST403) to an Acceptance Wait state (ST404) or the NG label (LA405).

In the Asoc Cfm Wait state (ST403), the control unit 100 waits to be notified of the information in the Association Response frame by the first wireless communication unit 101. In general, the maximum waiting time for the Association Response frame is set in the command (corresponding to an MLME-ASSOCIATE.request primitive according to the IEEE 802.11 wireless LAN standard) to transmit the Association Request frame.

The wireless communication unit 101 waits for the Association Response frame from the desired access point until the maximum waiting time elapses. If the wireless communication unit 101 receives the Association Response frame from the desired access point before the maximum waiting time elapses, the wireless communication unit 101 notifies the control unit 100 of the information in the received Association Response frame. Moreover, even if the maximum waiting time elapses before the wireless communication unit 101 receives the Association Response frame from the desired access point, the wireless communication unit 101 needs to notify the control unit 100 of information indicative of a failure to receive the Association Response frame.

That is, regardless of whether or not the Association Response frame is successfully received, the wireless communication unit 101 notifies the control unit 100 of information concerning the Association Response frame (Asoc Cfm Info in FIG. 6C; corresponding to an MLME-ASSOCIATE.confirm primitive according to the IEEE 802.11 wireless LAN standard). The information includes a code (a result code in FIG. 6C) indicative of a result for the command to transmit the Association Request frame. The control unit 100 can determine whether or the connection request has been accepted based on the value set in the result code.

Specifically, if the first wireless communication unit 101 has received the Association Response frame from the desired access point, the above-described status code is converted into the result code. For example, if "0" (successful) is set in the status code, Success is set in the result code. On the other hand, if a value other than "0" is set in the status code, a value other than Success is set in the result code. If the Association Response frame has failed to be received, the value other than Success is also set in the result code.

Success set in the result code allows the control unit 100 to confirm that the connection request has been accepted. Then, the control unit 100 provides the first wireless communication unit 101 with a command to transmit a data frame containing the ticket information (Ticket Info in FIG. 6C) and shifts to the Acceptance Wait state (ST404). On the other hand, the value other than Success set in the result code allows the control unit 100 to shift to the NG label (LA405).

Figure 6D:
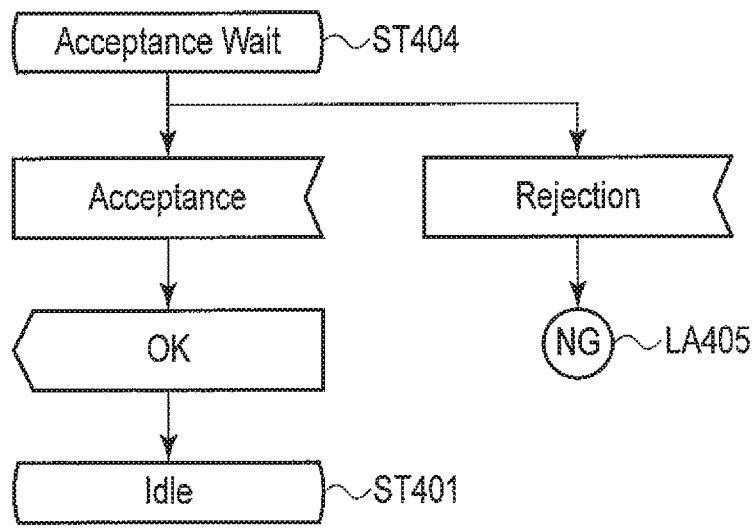
FIG. 6D is a diagram illustrating operation of the control unit of the wireless communication apparatus according to the first embodiment.

FIG. 6D shows inputs to and outputs from the control unit 100 during a transition of the control unit 100 from the Acceptance Wait state (ST404) to the Idle state (ST401) or the NG label (LA405).

In the Acceptance Wait state (ST404), the control unit 100 waits for an authentication result for the transmitted ticket information. If the authentication apparatus 20 determines the transmitted ticket information to be appropriate, the control unit 100 is notified of information indicating that the passage is accepted (Acceptance in FIG. 6D). Then, the control unit 100 notifies the user of information indicative of authentication acceptance on the application (OK in FIG. 6D) via the user interface unit 103 and then shifts to the Idle state (ST401). On the other hand, if the authentication apparatus 20 determines the transmitted ticket information not to be appropriate, the control unit 100 is notified of information indicating that the passage is rejected (Rejection in FIG. 6D). The control unit 100 then shifts to the NG label (LA405).

As described above, in the example illustrated in FIG. 6A, FIG. 6B, FIG. 6C, and FIG. 6D, it is assumed that the second wireless communication scheme does not provide a mechanism for directly confirming that communication is completed. If a mechanism is provided which allows direct confirmation of completion of communication in the second wireless communication scheme, the control unit 100 may operate as illustrated in FIG. 7A, FIG. 7B, FIG. 7C, FIG. 7D, and FIG. 7E instead of FIG. 6A, FIG. 6B, FIG. 6C, and FIG. 6D.

Figure 7A:
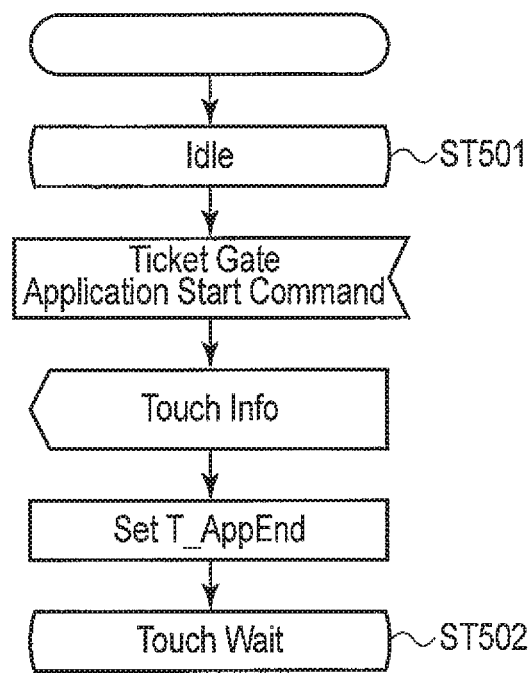
FIG. 7A is a diagram illustrating operation of the control unit of the wireless communication apparatus according to the first embodiment.

FIG. 7A shows inputs to and outputs from the control unit 100 and internal processing by the control unit 100 during a transition of the control unit 100 from an Idle state (ST501) to a Touch Wait state (ST502).

In the Idle state (ST501), for example, the control unit 100 is notified of a command to start the application (the Ticket Gate Application Start command in FIG. 7A) based on an operation on the user interface unit 103. The control unit 100 provides the second wireless communication unit 102 with a command to transmit a signal (Touch Info in FIG. 7A). Touch Info includes an SSID, a reservation ID, and the MAC address of the first wireless communication unit 101.

Moreover, the control unit 100 sets the maximum time for waiting for the Probe Response frame in the timer (T_AppEnd in FIG. 7A), and shifts to a Touch Wait state (ST502).

Figure 7B:
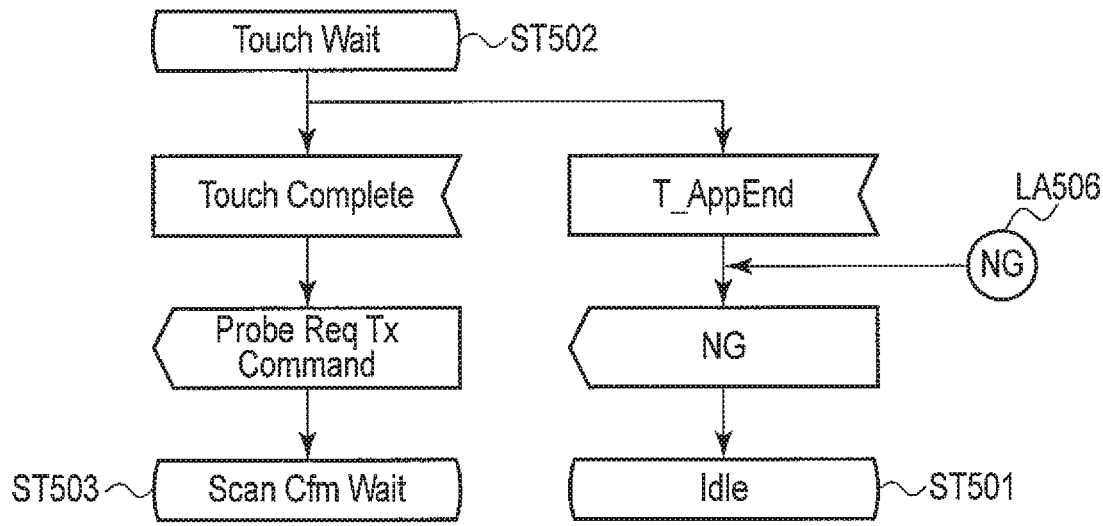
FIG. 7B is a diagram illustrating operation of the control unit of the wireless communication apparatus according to the first embodiment.

FIG. 7B shows inputs to and outputs from the control unit 100 during a transition of the control unit 100 from the Touch Wait state (ST502) to a Scan Cfm Wait state (ST503) or the Idle state (ST501). Moreover, FIG. 7B shows outputs from the control unit 100 during a transition of the control unit 100 from an NG label (LA506) to the Idle state (ST501).

In the Touch Wait state (ST502), the control unit 100 waits to be notified, by the second wireless communication unit 102, of information indicating that the communication of Touch Info is completed (Touch Complete in FIG. 7B).

When notified of Touch Complete, the control unit 100 provides the first wireless communication unit 101 with a command to transmit the Probe Request frame (a Probe Req Tx command in FIG. 7B), and shifts to a Scan Cfm Wait state (ST503).

At the NG label (LA506), the control unit 100 notifies the user of information indicative of authentication rejection on the application (NG in FIG. 7B) via the user interface unit 103 and then shifts to the Idle state (ST501). If the timer (T_AppEnd in FIG. 7B) times out without notification of Touch Complete from the second wireless communication unit 102, the control unit 100 performs an operation that is the same as or similar to the operation performed at the NG label (LA506).

Figure 7C:
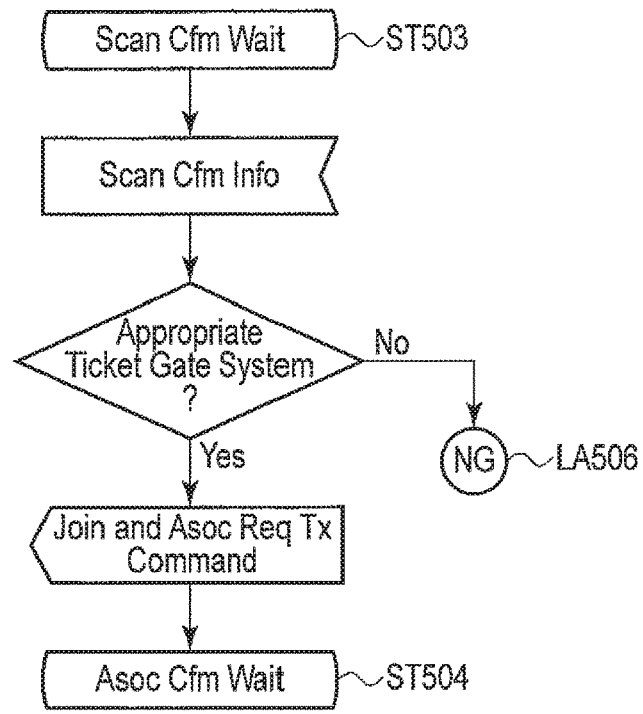
FIG. 7C is a diagram illustrating operation of the control unit of the wireless communication apparatus according to the first embodiment.

FIG. 7C shows inputs to and outputs from the control unit 100 during a transition of the control unit 100 from the Scan Cfm Wait state (ST503) to an Asoc Cfm Wait state (ST504) or the NG label (LA506).

In the Scan Cfm Wait state (ST503), the control unit 100 waits to be notified of the information of a scan result including the information extracted from a Probe Response frame if the Probe Response frame is received (Scan Cfm Info in FIG. 7C) by the first wireless communication unit 101.

When notified of Scan Cfm Info, the control unit 100 determines whether or not the Probe Response frame has been received from the appropriate access point (authentication apparatus 20). If the Probe Response frame has been received from the appropriate access point, the control unit 100 provides the first wireless communication unit 101 with commands to synchronize with a BSS specified by a BSSID equal to the MAC address of the access point and to transmit the Association Request frame to the access point (the Join and Asoc Req Tx command in FIG. 7C). The control unit 100 then shifts to the Asoc Cfm Wait state (ST504). On the other hand, if the Probe Response frame has not been received from the appropriate access point, then the control unit 100 shifts to the NG label (LA506).

Figure 7D:
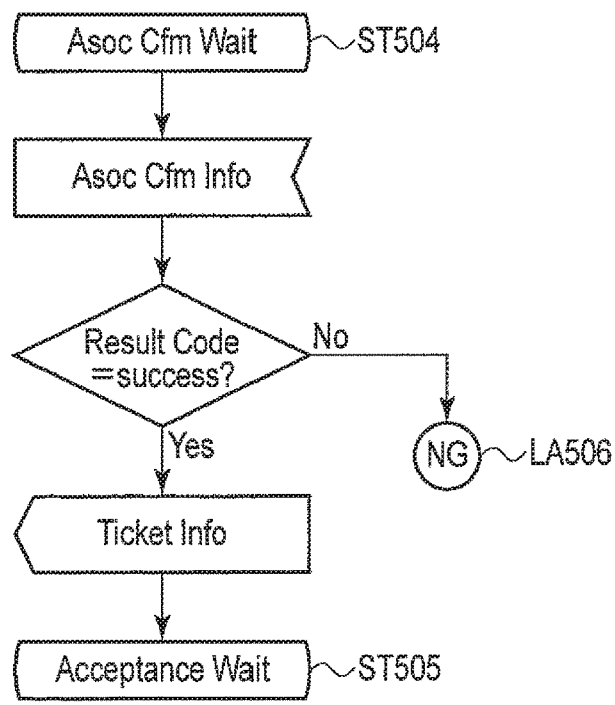
FIG. 7D is a diagram illustrating operation of the control unit of the wireless communication apparatus according to the first embodiment.

FIG. 7D shows inputs to and outputs from the control unit 100 during a transition of the control unit 100 from the Asoc Cfm Wait state (ST504) to an Acceptance Wait state (ST505) or the NG label (LA506). FIG. 7D illustrates operations that are the same as or similar to the operations illustrated in FIG. 6C and will thus not be described below.

Figure 7E:
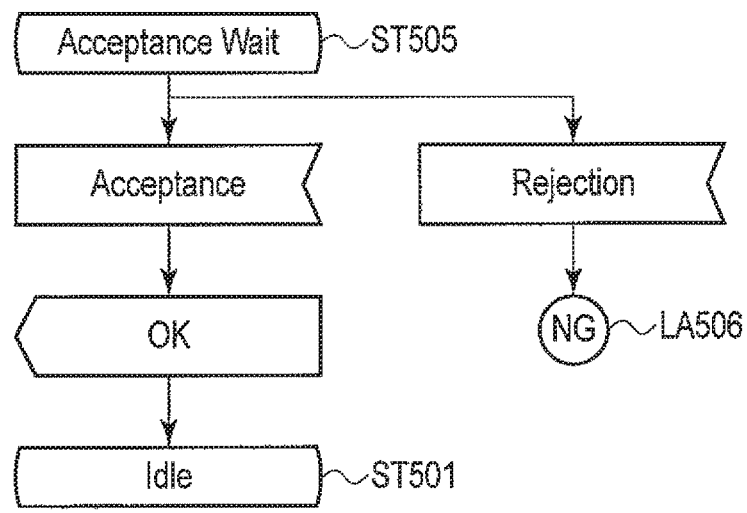
FIG. 7E is a diagram illustrating operation of the control unit of the wireless communication apparatus according to the first embodiment.

FIG. 7E shows inputs to and outputs from the control unit 100 during a transition of the control unit 100 from the Acceptance Wait state (ST505) to the Idle state (ST501) or the NG label (LA506). FIG. 7E illustrates operations that are the same as or similar to the operations illustrated in FIG. 6D and will thus not be described below.

The details of operation of the control unit 200 provided in the authentication apparatus 20 according to the present embodiment can be described using the SDL as illustrated in FIG. 8A, FIG. 8B, FIG. 8C, and FIG. 8D.

In the description below, it is assumed that the terminal management entity provided in the control unit 200 gives commands to the MAC sublayer management entity to allow the first wireless communication unit 201 to be controlled.

Figure 8A:
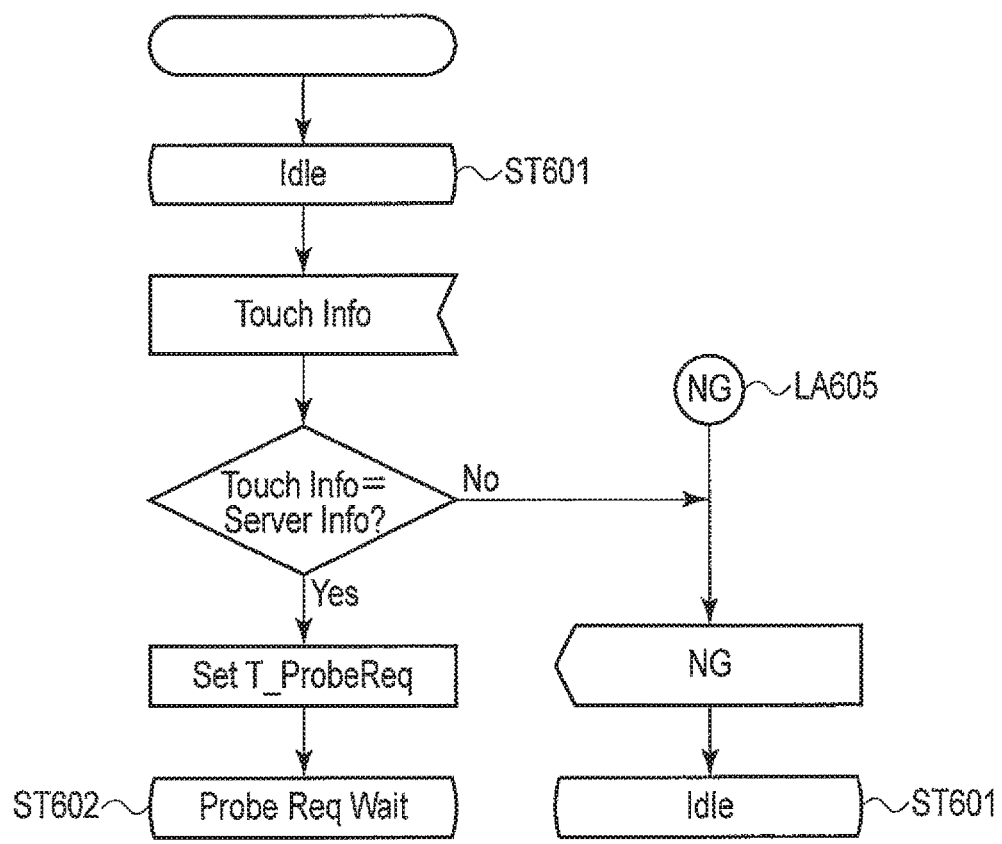
FIG. 8A is a diagram illustrating operation of a control unit of the authentication apparatus according to the first embodiment.

FIG. 8A shows inputs to and outputs from the control unit 200 and internal processing by the control unit 200 during a transition of the control unit 200 from an Idle state (ST601) to a Probe Req Wait state (ST602) or the Idle state (ST601). Moreover, FIG. 8A shows an output from the control unit 200 during a transition of the control unit 200 from an NG label (LA605) to the Idle state (ST601).

In the Idle state (ST601), the control unit 200 is notified, by the second wireless communication unit 202, of the information in the signal received by the second wireless communication unit 202 (Touch Info in FIG. 8A). Touch Info includes an SSID, a reservation ID, and the MAC address of the first wireless communication unit 101.

When notified of Touch Info, the control unit 200 determines whether or not Touch Info matches the information acquired from the server 30 (Server Info). If Touch Info matches Server Info, the control unit 200 sets the maximum time for waiting for the Probe Request frame, in a timer (T_ProbeReq in FIG. 8A), and shifts to the Probe Req Wait state (ST602).

Server Info includes an SSID and a plurality of acceptable reservation IDs. The match between Touch Info and Server Info means that the SSID included in Touch Info matches the SSID included in Server Info and that the reservation ID included in Touch Info matches one of the plurality of acceptable reservation IDs included in Server Info.

At the NG label (LA605), the control unit 200 notifies the user of information indicative of authentication rejection on the application (NG in FIG. 8A) via the user interface unit 203 and then shifts to the Idle state (ST601). For example, the user interface unit 203 closes the flap door and displays an image indicating that the passage is rejected.

If Touch Info fails to match Server Info, the control unit 200 performs an operation that is the same as or similar to the operation performed at the NG label (LA605). Moreover, the control unit 200 may perform an operation that is the same as or similar to the operation performed at the NG label (LA605) if passage of a human being is detected without notification of Touch Info.

Figure 8B:
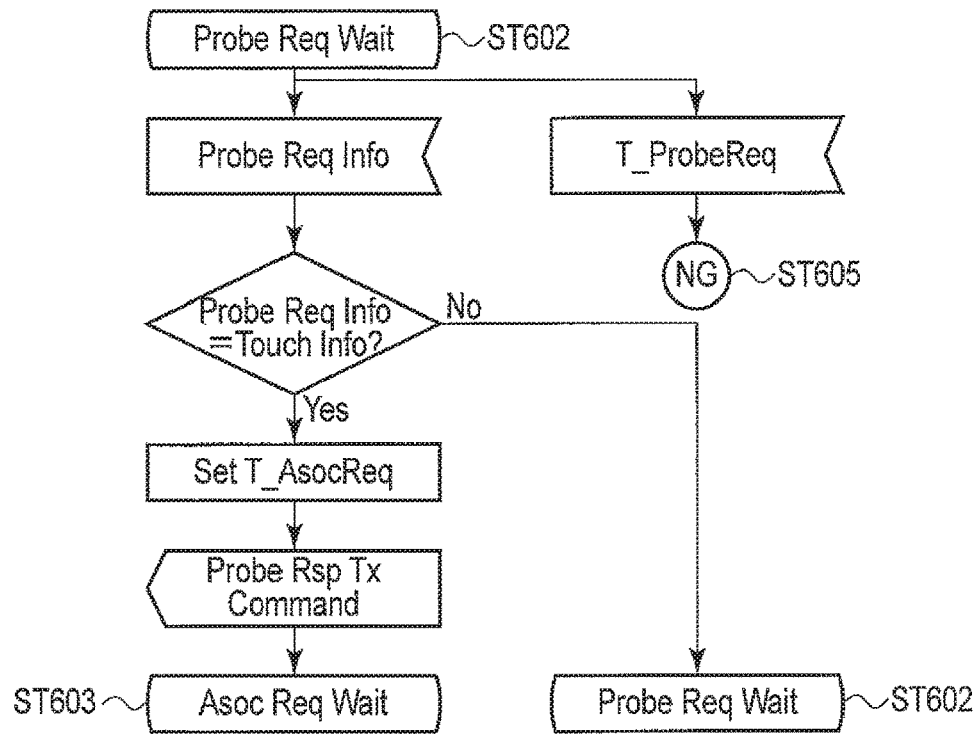
FIG. 8B is a diagram illustrating operation of the control unit of the authentication apparatus according to the first embodiment.

FIG. 8B shows inputs to and outputs from the control unit 200 and internal processing by the control unit 200 during a transition of the control unit 200 from the Probe Req Wait state (ST602) to an Asoc Req Wait state (ST603), a Probe Req Wait state (ST602), or the NG label (LA605).

In the Probe Req Wait state (ST602), the control unit 200 waits to be notified of the information in the Probe Request frame (Probe Req Info in FIG. 8B) by the first wireless communication unit 201.

When notified of Probe Req Info, the control unit 200 determines whether Probe Req Info matches Touch Info. A match between Probe Req Info and Touch Info means that the value set in the source address in Probe Req Info matches the MAC address of the first wireless communication unit 101 included in Touch Info and that the SSID and reservation ID included in Probe Req Info match the SSID and reservation ID included in Touch Info.

If Probe Req Info matches Touch Info, the control unit 200 sets the maximum time for waiting for the Association Request frame, in a timer (T_AsocReq in FIG. 8B). Moreover, the control unit 200 provides the first wireless communication unit 201 with a command to transmit the Probe Response frame to the desired wireless communication apparatus 10 (a Probe Rsp Tx command in FIG. 8B). The control unit 200 then shifts to the Asoc Req Wait state (ST603).

If Probe Req Info fails to match Touch Info, the control unit 200 shifts to the Probe Req Wait state (ST602). However, if the source of the Probe Request frame is definitely the same as the source of Touch Info, the control unit 200 may shift to the NG label (LA605). Furthermore, if the T_ProbeReq times out without notification of Probe Req Info from the desired wireless communication apparatus 10, the control unit 200 shifts to the NG label (LA605).

Figure 8C:
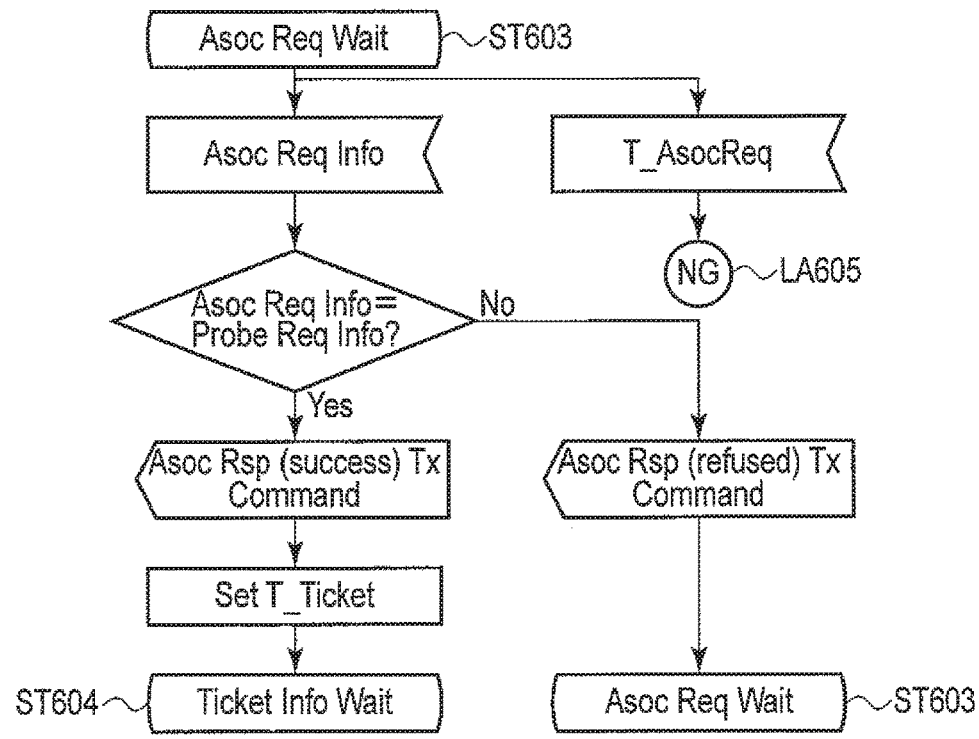
FIG. 8C is a diagram illustrating operation of the control unit of the authentication apparatus according to the first embodiment.

FIG. 8C shows inputs to and outputs from the control unit 200 and internal processing by the control unit 200 during a transition of the control unit 200 from the Asoc Req Wait state (ST603) to a Ticket Info Wait state (ST604), the Asoc Req Wait state (ST603), or the NG label (LA605).

In the Asoc Req Wait state (ST603), the control unit 200 waits to be notified of the information in the Association Response frame (Asoc Req Info in FIG. 8C) by the first wireless communication unit 201.

When notified of Asoc Req Info, the control unit 200 determines whether Asoc Req Info matches Probe Req Info. A match between Asoc Req Info and Probe Req Info means that various pieces of information (for example, the value set in the source address) included in Asoc Req Info match the corresponding pieces of information included in Proc Req Info.

If Asoc Req Info matches Probe Req Info, the control unit 200 provides the first wireless communication unit 201 with a command to transmit the Association Response frame containing a value indicating that the connection request is to be accepted (an Asoc Rsp (success) Tx command in FIG. 8C). Moreover, the control unit 200 sets the maximum time for waiting for a data frame containing the ticket information, in a timer (T_Ticket in FIG. 8C), and shifts to the Ticket Info Wait state (ST604).

If the authentication apparatus 20 exchanges data frames containing information other than the ticket information, for example, contents information or advertisement information, with the wireless communication apparatus 10, the control unit 200 desirably provides a command enabling data transmissions to an element corresponding to the application layer of the wireless LAN.

If Asoc Req Info fails to match Probe Req Info, the control unit 200 provides the first wireless communication unit 201 with a command to transmit the Association Response frame containing a value indicating that the connection request is to be rejected (an Asoc Rsp (refused) Tx command in FIG. 8C). The control unit 200 then shifts to the Asoc Req Wait state (ST603). However, if the source of the Association Request frame is definitely the same as the source of the Probe Request frame, the control unit 200 may shift to the NG label (LA605).

If T_AsocReq times out without notification of Asoc Req Info from the desired wireless communication apparatus 10, the control unit 200 shifts to the NG label (LA605).

Figure 8D:
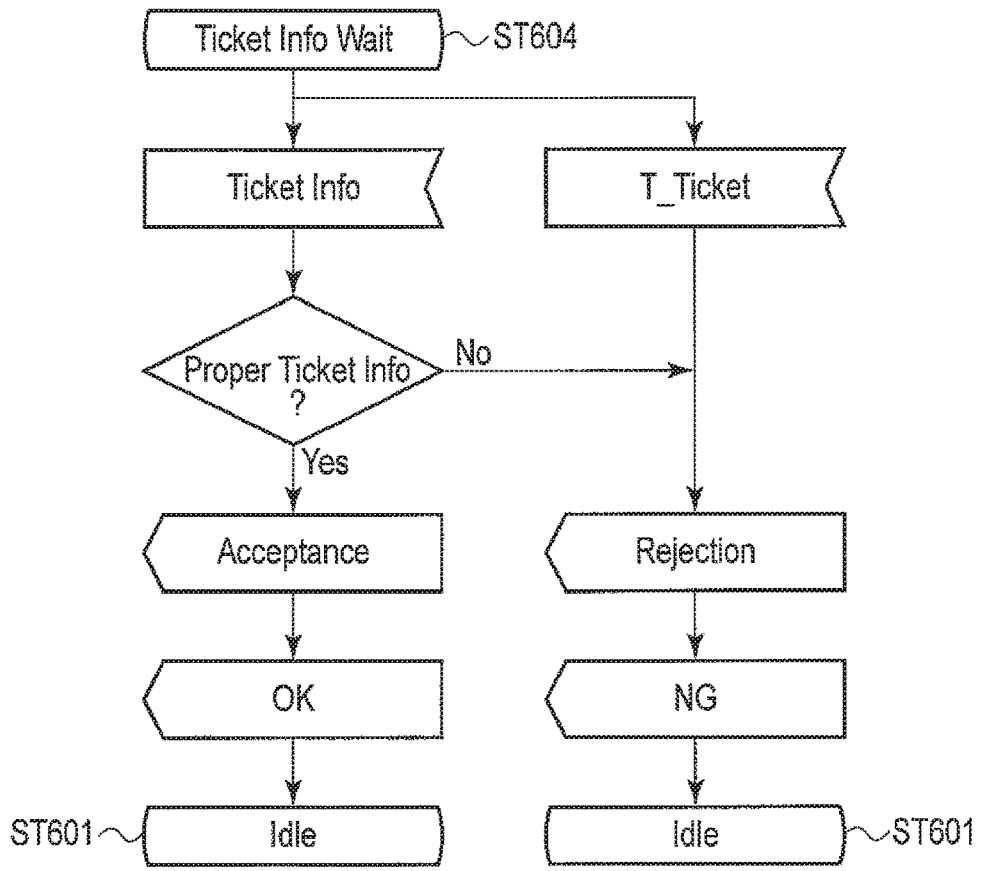
FIG. 8D is a diagram illustrating operation of the control unit of the authentication apparatus according to the first embodiment.

FIG. 8D shows inputs to and outputs from the control unit 200 during a transition of the control unit 200 from the Ticket Info Wait state (ST604) to the Idle state (ST601).

In the Ticket Info Wait state (ST604), the control unit 200 waits to be notified of ticket information (Ticket Info in FIG. 8D) by the first wireless communication unit 201.

When notified of Ticket Info, the control unit 200 determines whether or not the Ticket Info is appropriate. If Ticket Info is appropriate, the control unit 200 provides the first wireless communication unit 201 with a command to transmit a data frame containing information indicating that the passage is accepted (Acceptance in FIG. 8D). Moreover, the control unit 200 notifies the user of information indicative of authentication acceptance on the application (OK in FIG. 8D) via the user interface unit 203 and then shifts to the Idle state (ST601).

On the other hand, if Ticket Info is not appropriate, the control unit 200 provides the first wireless communication unit 201 with a command to transmit a data frame containing information indicating that the passage is rejected (Rejection in FIG. 8D). Moreover, the control unit 200 notifies the user of information indicative of authentication rejection on the application (NG in FIG. 8D) via the user interface unit 203 and then shifts to the Idle state (ST601).

Furthermore, if T_Ticket times out without notification of Ticket Info, the control unit 200 provides the first wireless communication unit 201 with the Rejection command to transmit a data frame containing information indicating that the passage is rejected. Moreover, the control unit 200 notifies the user of NG via the user interface unit 203, and shifts to the Idle state (ST601). However, if T_Ticket times out, the exchange of data frames between the authentication apparatus 20 and the wireless communication apparatus 10 may be difficult for some reason. Hence, the control unit 200 may save the communication capacity by omitting the Rejection command, which is to transmit the data frame containing information indicating that the passage is rejected.

Each of the various signals described in FIG. 6A, FIG. 6B, FIG. 6C, FIG. 6D, FIG. 7A, FIG. 7B, FIG. 7C, FIG. 7D, FIG. 7E, FIG. 8A, FIG. 8B, FIG. 8C, and FIG. 8D can be associated with any one of the various service primitives defined in the IEEE 802.11 wireless LAN standard.

The Probe Req Tx command in FIG. 6A and FIG. 7B corresponds to MLME-SCAN.request. Scan Cfm Info in FIG. 6B and FIG. 7C corresponds to MLME-SCAN.confirm.

The synchronization command, included in the Join and Asoc Req Tx command in FIG. 6B and FIG. 7C, corresponds to MLME-JOIN.request. Although not described with reference to FIG. 6B and FIG. 7C, information indicative of the result of the synchronization command is transmitted from the MLME to the SME. The information indicative of the result of the synchronization command corresponds to MLME-JOIN.confirm. The command to transmit the Association Request frame, included in the Join and Asoc Req Tx command, corresponds to MLME-ASSOCIATE.request.

Asoc Cfm Info in FIG. 6C and FIG. 7D corresponds to MLME-ASSOCIATE.confirm. Asoc Req Info in FIG. 8C corresponds to MLME-ASSOCIATE.indication. The Asoc Rsp (success) Tx command and Asoc Rsp (refused) Tx command in FIG. 8C correspond to MLME-ASSOCIATE.response.

According to the IEEE 802.11 wireless LAN standard, the SME does not determine whether or not to transmit the Probe Response frame in response to the Probe Request frame. That is, the command to transmit the Probe Response frame is provided by the MLME.

However, according to the description of FIG. 8B, the SME is notified of Probe Req Info by the MLME. Moreover, the SME determines whether or not to provide the Probe Rsp Tx command to the MLME based on Probe Req Info.

In general, according to the IEEE 802.11 wireless LAN standard, signals exchanged between the SME and the MLME are defined as service primitives. Hence, a service primitive corresponding to the notification of Probe Req Info and a service primitive corresponding to the Probe Rsp Tx command need to be newly defined in order to associate the example of operation in FIG. 8B with the IEEE 802.11 wireless LAN standard.

The Ticket Info command in FIG. 6C and FIG. 7D, the Acceptance command in FIG. 8D, and the Rejection command are commands to transmit data frames, each including ticket information, acceptance indication, and rejection indication, and correspond to MA-UNITDATA.request. Although not described with reference to FIG. 6C, FIG. 7D, and FIG. 8D, the notification of information indicative of the result of MA-UNITDATA.request corresponds to MA-UNITDATA.confirm or MA-UNITDATA-STATUS.indication.

The notification of Acceptance in FIG. 6D and FIG. 7E, the notification of Rejection in FIG. 6D and FIG. 7E, and the notification of Ticket Info in FIG. 8D correspond to MA-UNITDATA.indication.

In the description of FIG. 3, FIG. 6A, FIG. 6B, FIG. 6C, FIG. 6D, FIG. 7A, FIG. 7B, FIG. 7C, FIG. 7D, FIG. 7E, FIG. 8A, FIG. 8B, FIG. 8C, and FIG. 8D, the exchange of frames for the Association process has been discussed. Based on the IEEE 802.11 wireless LAN standard, frames for the Authentication process may be exchanged in addition to the frames for the Association process. The exchange of the frames for the Authentication process may be carried out before or after the exchange of the frames for the Association process. The order of the frame exchanges depends on the manner of setting security. Information exchanged via the Authentication process may be also used at the authentication apparatus to check the wireless communication apparatus by a similar way as in the Association process described above.

As described above, the wireless communication apparatus according to the present embodiment transmits signals to the authentication apparatus according to the present embodiment based on the second wireless communication scheme. The authentication apparatus performs first-stage authentication by comparing information in a signal received from the wireless communication apparatus with information from the server. Upon receiving a signal for a scan (for example, the Probe Request frame) after the first-stage authentication, the authentication apparatus transmits a signal for a response (for example, the Probe Request frame) only if the source address of the signal matches the information contained in the above-described received signal based on the second wireless communication scheme. Hence, the wireless communication apparatus can easily determine the destination address of a signal for a connection request (for example, the Association Request frame) which address corresponds to one of a plurality of nearby authentication apparatuses. The wireless communication apparatus can thus transmit a connection request to the determined authentication apparatus in a short time. The authentication apparatus performs second-stage authentication by using the received signal based on the second wireless communication scheme to determine whether or not to accept the connection request. The authentication apparatus performs third-stage authentication by determining whether or not ticket information contained in a data frame is appropriate after the connection is completed. Thus, the present embodiment enables secure authentication using wireless communication.

The wireless communication apparatus 10 in FIG. 1 can be adapted by power supply control to consume less power. For example, the wireless communication apparatus 10 transmits a signal based on the second wireless communication scheme and then transmits a signal based on the first wireless communication scheme. Thus, even if a power supply for the operation of the first wireless communication unit 101 is partly or entirely turned off before the transmission of a signal is started based on the first wireless communication scheme, by taking an appropriate margin to start up the first wireless communication unit 101 before the transmission, the wireless communication apparatus 10 can operate without any problem.

Furthermore, the wireless communication apparatus 10 starts exchanging a signal for a connection request, a signal for a data transmission, and the like with the desired authentication apparatus only if the wireless communication apparatus 10 transmits a signal for a scan and receives a signal for a response to the signal for a scan from the desired authentication apparatus before the timer times out. Hence, for example, if the first wireless communication unit 101 can be configured to comprise a power supply for the operation of a functional unit for exchange of the signal for a scan and a separately formed power supply for the operation of a functional unit for exchange of the signal for a connection request and a functional unit for exchange of the signal for a data transmission, then the wireless communication apparatus 10 can be adapted by this power supply control to consume less power. Specifically, even if the power supply for the operation of the functional unit for exchange of the signal for a connection request and the functional unit for exchange of the signal for a data transmission is partly or entirely turned off until the wireless communication apparatus 10 receives the signal for a response to the signal for a scan from the desired authentication apparatus and acquires address information on the authentication apparatus, the wireless communication apparatus 10 can operate without any problem.

Upon receiving the signal for a scan, the authentication apparatus 20 determines whether or not to transmit the signal for a response to the signal for a scan using information contained in a received signal based on the second wireless communication scheme. Hence, the authentication apparatus 20 prevents possible exchange of redundant signals (for example, the Probe Response frame, the Association Request frame, and the Association Response frame). That is, the relevant medium is restrained from being occupied, allowing communication capacity to be easily saved. For example, if CSMA/CA (Carrier Sense Multiple Access with Carrier Avoidance) is adopted as is the case with the IEEE 802.11 wireless LAN standard, the occupancy of the medium by a certain wireless communication apparatus means a delay in the transmission of frames by another wireless communication apparatus. If the authentication apparatus 20 is an automatic ticket gate, in order to smoothly manage entries and exits, it is desirable for the authentication apparatus 20 to connect to the wireless communication apparatus 10 and complete the exchange of data frames with the wireless communication apparatus 10 within a short time. The authentication apparatus 20 restrains the medium from being occupied, eventually allowing authentication to be completed within a short time. That is, smooth management of entries and exits can be achieved at the authentication apparatus 20.

Second Embodiment

A wireless communication apparatus and an authentication apparatus according to a second embodiment are basically the same as or similar to the wireless communication apparatus and authentication apparatus described above in the first embodiment except that the wireless communication apparatus according to the second embodiment omits the transmission of the Probe Request frame.

Figure 9:
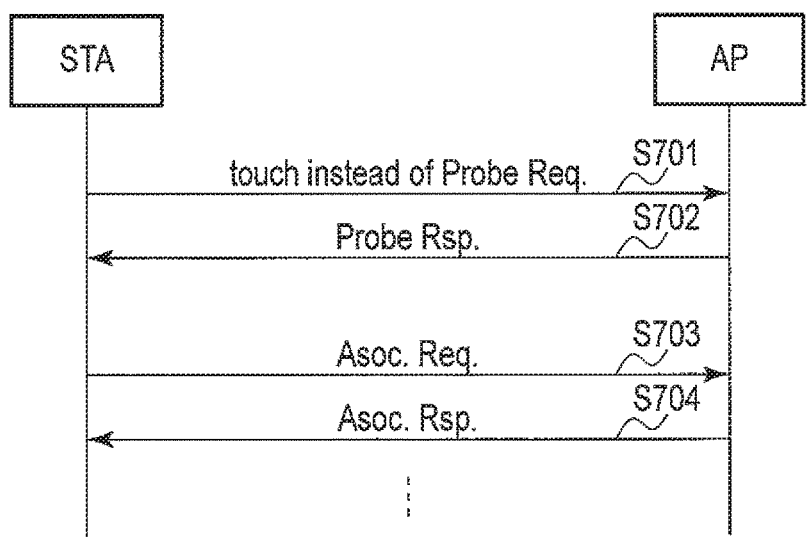
FIG. 9 is a diagram illustrating signals exchanged between a wireless communication apparatus and an authentication apparatus according to a second embodiment.

FIG. 9 illustrates signals exchanged between the wireless communication apparatus 10 and the authentication apparatus 20. In FIG. 9, STA is an abbreviation of "station" and denotes the wireless communication apparatus 10. Similarly, AP is an abbreviation of "access point" corresponding to a base station and denotes the authentication apparatus 20.

First, the user operates the user interface unit 103 of the wireless communication apparatus 10, and the control unit 100 of the wireless communication apparatus 10 executes a certain application. The application may be executed based on a condition different from the user operation. Specifically, the application may be automatically executed on the condition that the wireless communication apparatus 10 enters a communication area based on a second wireless communication scheme provided by the authentication apparatus 20.

When the application is executed, the control unit 100 provides the second wireless communication unit 102 with a command to transmit a signal (S701). The signal (S701) includes an SSID, a reservation ID, and the MAC address of the first wireless communication unit 101. The signal (S701) is received by the second wireless communication unit 202.

The second wireless communication unit 202 notifies the control unit 200 of the information in the signal (S701). The control unit 200 checks the signal (S701) for its consistency. Specifically, the control unit 200 determines whether or not the SSID contained in the signal (S701) matches an SSID designated by the server 30. Moreover, the control unit 200 determines whether or not the reservation ID contained in the signal (S701) matches one of a plurality of acceptable reservation IDs designated by the server 30.

If both the SSID and reservation ID contained in the signal (S701) are appropriate, the authentication apparatus 20 continues to authenticate the wireless communication apparatus 10. Specifically, the control unit 200 provides the first wireless communication unit 201 with a command to transmit the Probe Response frame (S702). The Probe Response frame (S702) is the same as or similar to the Probe Response frame (S303) in FIG. 3. On the other hand, if at least one of the SSID and reservation ID contained in the signal (S701) is inappropriate, the authentication apparatus 20 discontinues the authentication process (rejects authentication) of the wireless communication apparatus 10. Furthermore, for example, the authentication apparatus 20 closes the flap door and displays an image indicating that passage is rejected.

The control unit 200 sets the destination address field of the Probe Response frame (S702) to the MAC address of the first wireless communication unit 101. The MAC address of the first wireless communication unit 101 can be acquired from the signal (S701).

The control unit 200 sets the MAC address of the first wireless communication unit 201 in the source address field and BSSID field of the Probe Response frame (S702). The control unit 200 sets the SSID in the frame body of the Probe Response frame (S702). The SSID can be acquired from the server 30 and from the signal (S701).

The Probe Response frame is received by the first wireless communication unit 101. The first wireless communication unit 101 determines whether or not the destination address in the Probe Response frame (S702) is appropriate. The appropriate destination address means that the value set in the destination address matches the MAC address of the first wireless communication unit 201. If the destination address in the Probe Request frame (S702) is appropriate, the first wireless communication unit 101 continues the reception process. The first wireless communication unit 101 notifies the control unit 100 of the information in the Probe Request frame (S702).

When notified of the information in the Probe Response frame (S702), the control unit 100 provides the first wireless communication unit 101 with a command to transmit the Association Request frame (S703). The Association Request frame (S703) is the same as or similar to the Association Request frame (S304) in FIG. 3.

The control unit 100 sets the MAC address of the first wireless communication unit 201 in the destination address field and BSSID field of the Association Request frame (S703). The MAC address of the first wireless communication unit 201 can be acquired from the Probe Response frame (S702).

The control unit 100 sets the MAC address of the first wireless communication unit 101 in the source address field of the Association Request frame (S703). The control unit 100 sets an SSID in the frame body of the Association Request frame (S703). The SSID can be acquired from the server 30 (at the time of purchase of a ticket) and from the Probe Response frame (S702).

The Association Request frame (S703) is received by the first wireless communication unit 201. The first wireless communication unit 201 determines whether or not the destination address in the Association Request frame (S703) is appropriate. If the destination address in the Association Request frame (S703) is appropriate, the first wireless communication unit 201 continues the reception process. The first wireless communication unit 201 notifies the control unit 200 of the information in the Association Request frame (S703).

The control unit 200 checks the Association Request frame (S703) for its consistency. Specifically, the control unit 200 determines whether or not the value set in the source address field of the Association Request frame (S703) matches the MAC address of the first wireless communication unit 101 contained in the signal (S701).

The control unit 200 then provides the first wireless communication unit 201 with a command to transmit the Association Response frame (S704). The Association Response frame (S704) is the same as or similar to the Association Response frame (S305) in FIG. 3.

A value indicating whether the connection request is to be accepted or rejected is set in the status code field carried in the Association Response frame (S704). Specifically, if the value set in the source address in the received frame (S703) matches the MAC address of the first wireless communication unit 101 contained in the signal (S701), the control unit 200 sets a value indicating that the connection request is to be accepted, in the status code field. On the other hand, if the value set in the source address in the received frame (S703) fails to match the MAC address of the first wireless communication unit 101 contained in the signal (S701), the control unit 200 sets a value indicating that the connection request is to be rejected, in the status code field.

The control unit 200 may determine whether the connection request is to be accepted or rejected based on the consistency of the SSID in addition to the source address. For example, if the SSID set in the frame body of the Association Request frame (S703) fails to match the SSID contained in the signal (S701), the control unit 200 may set a value indicating that the connection request is to be rejected, in the status code field. Furthermore, the control unit 200 may determine whether the connection request is to be accepted or rejected based on the consistency of the reservation ID in addition to the source address. For example, if the reservation ID set in the frame body of the Association Request frame (S703) fails to match the reservation ID contained in the signal (S701), the control unit 200 may set a value indicating that the connection request is to be rejected, in the status code field.

The control unit 200 sets the MAC address of the first wireless communication unit 101 in the destination address field of the Association Response frame (S704). The MAC address of the first wireless communication unit 101 can be acquired from the Association Request frame (S703) and the signal (S701).

The control unit 200 sets the MAC address of the first wireless communication unit 201 in the source address field and BSSID field of the Association Response frame (S704). The control unit 200 sets a value indicating whether the connection request is to be accepted or rejected, in the status code field carried in the frame body of the Association Response frame (S704). For example, if the connection request is to be accepted, the control unit 200 sets "0" (that is, Successful) in the status code field. If the connection request is to be rejected, the control unit 200 sets a value other than "0" in the status code field. A new status code value indicating that the connection request is to be rejected may be defined.

The Association Response frame (S704) is received by the first wireless communication unit 101. The first wireless communication unit 101 determines whether or not the destination address in the Association Response frame (S704) is appropriate. If the destination address in the Association Response frame (S704) is appropriate, the first wireless communication unit 101 continues the reception process. The first wireless communication unit 101 notifies the control unit 100 of the information in the Association Response frame (S704).

The control unit 100 determines whether the connection request is accepted or rejected based on the status code in the Association Response frame (S704). If the connection request is accepted, exchange of data frames is started between the wireless communication apparatus 10 and the authentication apparatus 20 via the wireless LAN.

The details of operation of the control unit 100 provided in the wireless communication apparatus 10 according to the present embodiment can be described using the SDL as illustrated in FIG. 10A, FIG. 10B, FIG. 10C, and FIG. 10D.

In the description below, it is assumed that the terminal management entity provided in the control unit 100 gives commands to the MAC sublayer management entity to allow the first wireless communication unit 101 to be controlled.

In the example illustrated in FIG. 10A, FIG. 10B, FIG. 10C, and FIG. 10D, it is assumed that the second wireless communication scheme does not provide a mechanism for directly confirming that communication is completed. For example, the second wireless communication scheme corresponds to communication implemented by displaying and reading a bar code. However, when notified of the information in the Probe Response frame from the appropriate access point, the control unit 100 can indirectly confirm that the communication based on the second wireless communication scheme is completed.

Figure 10A:
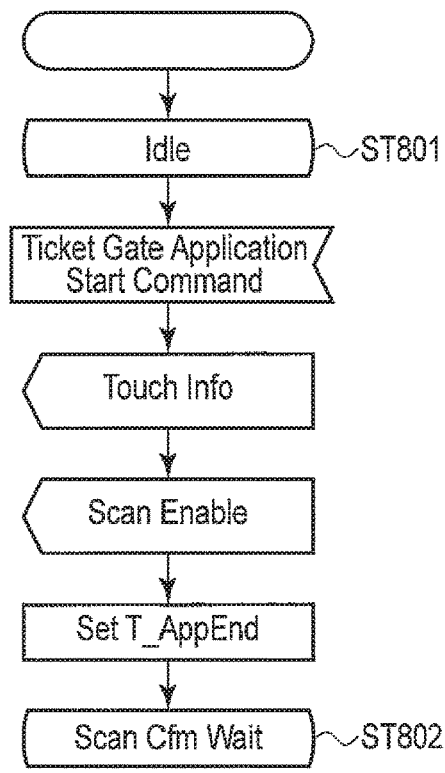
FIG. 10A is a diagram illustrating operation of a control unit of the wireless communication apparatus according to the second embodiment.

FIG. 10A shows inputs to and outputs from the control unit 100 and internal processing by the control unit 100 during a transition of the control unit 100 from the Idle state (ST801) to the Scan Cfm Wait state (ST802).

In the Idle state (ST801), for example, the control unit 100 is notified of a command to start the application (the Ticket Gate Application Start command in FIG. 10A) based on an operation on the user interface unit 103. The control unit 100 provides the second wireless communication unit 102 with a command to transmit a signal (Touch Info in FIG. 10A). Touch Info includes an SSID, a reservation ID, and the MAC address of the first wireless communication unit 101.

Moreover, the control unit 100 provides the first wireless communication unit 101 with a command to wait for the Probe Response frame for a specific period and to notify the control unit 100 of the information in the Probe Response frame (Scan Enable in FIG. 10A).

When provided with Scan Enable, the first wireless communication unit 101 operates to notify the control unit 100 of the information in the received Probe Response frame (Scan Cfm Info in FIG. 10B) when the first wireless communication unit 100 receives the Probe Response frame with the MAC address of the first wireless communication unit 101 set in the destination address for the first time.

Furthermore, the first wireless communication unit 101 may operate to filter the received Probe Response frame based on the destination address and other conditions and to notify the control unit 100 of Scan Cfm Info based on the Probe Response frame having first passed through all of the filtering.

In order to associate the example of operation in FIG. 10A with the IEEE 802.11 wireless LAN standard, a service primitive corresponding to Scan Enable and a service primitive corresponding to the notification of Scan Cfm Info need to be newly defined.

The control unit 100 sets the maximum time for waiting for the Probe Response frame in the timer (T_AppEnd in FIG. 10A), and shifts to the Scan Cfm Wait state (ST802).

Figure 10B:
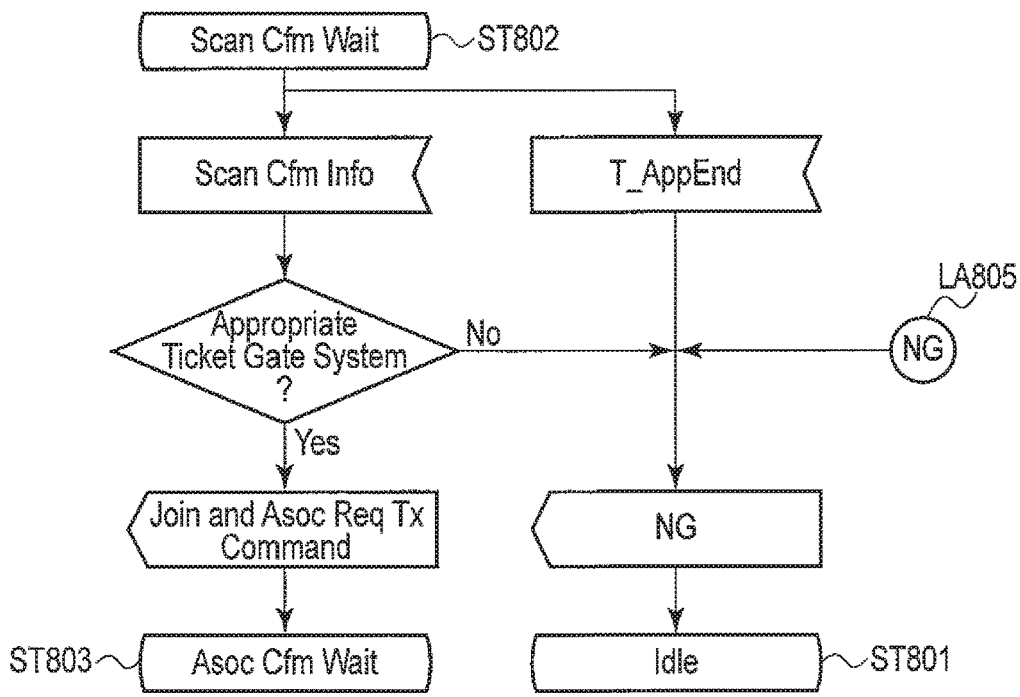
FIG. 10B is a diagram illustrating operation of the control unit of the wireless communication apparatus according to the second embodiment.

FIG. 10B shows inputs to and outputs from the control unit 100 during a transition of the control unit 100 from the Scan Cfm Wait state (ST802) to the Asoc Cfm Wait state (ST803) or the Idle state (ST801). Moreover, FIG. 10B shows an output from the control unit 100 during a transition of the control unit 100 from the NG label (LA805) to the Idle state (ST801). FIG. 10B illustrates an operation that is the same as or similar to the operation illustrated in FIG. 6B described above and will thus not be described.

Figure 10C:
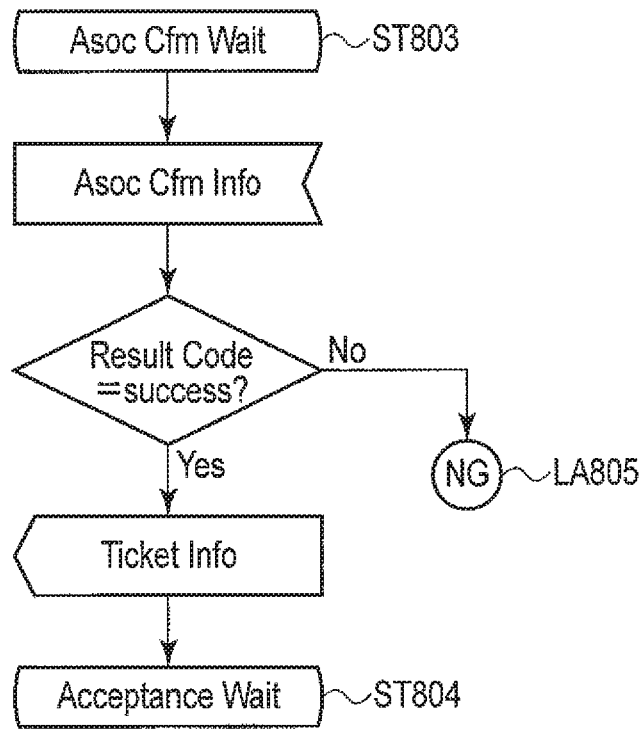
FIG. 10C is a diagram illustrating operation of the control unit of the wireless communication apparatus according to the second embodiment.

FIG. 10C shows inputs to and outputs from the control unit 100 during a transition of the control unit 100 from the Asoc Cfm Wait state (ST803) to the Acceptance Wait state (ST804) or the NG label (LA805). FIG. 10C illustrates an operation that is the same as or similar to the operation illustrated in FIG. 6C and FIG. 7D described above and will thus not be described.

Figure 10D:
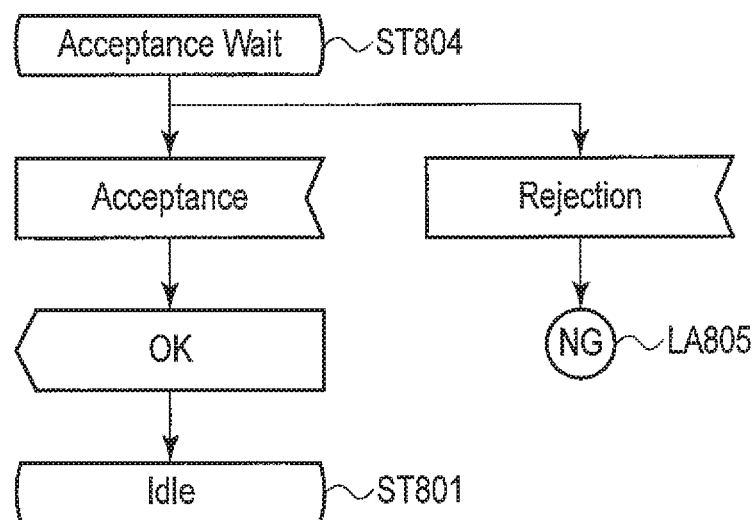
FIG. 10D is a diagram illustrating operation of the control unit of the wireless communication apparatus according to the second embodiment.

FIG. 10D shows inputs to and outputs from the control unit 100 during a transition of the control unit 100 from the Acceptance Wait state (ST804) to the Idle state (ST801) or the NG label (LA805). FIG. 10D illustrates an operation that is the same as or similar to the operation illustrated in FIG. 6D and FIG. 7E described above and will thus not be described.

As described above, in the example illustrated in FIG. 10A, FIG. 10B, FIG. 10C, and FIG. 10D, it is assumed that the second wireless communication scheme does not provide a mechanism for directly confirming that communication is completed. If the second wireless communication scheme provides a mechanism for directly confirming that communication is completed, the control unit 100 may operate as illustrated in FIG. 11A, FIG. 11B, FIG. 11C, FIG. 11D, and FIG. 11E instead of FIG. 10A, FIG. 10B, FIG. 10C, and FIG. 10D.

Figure 11A:
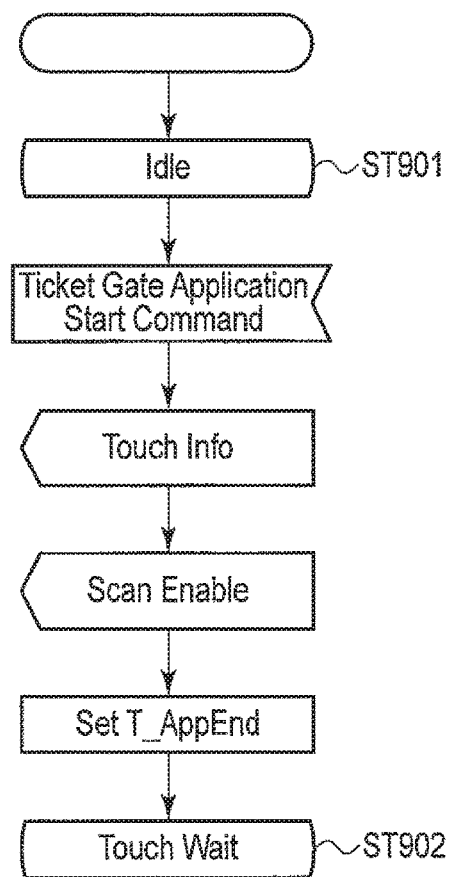
FIG. 11A is a diagram illustrating operation of the control unit of the wireless communication apparatus according to the second embodiment.

FIG. 11A shows inputs to and outputs from the control unit 100 and internal processing by the control unit 100 during a transition of the control unit 100 from the Idle state (ST901) to the Touch Wait state (ST902).

In the Idle state (ST901), for example, the control unit 100 is notified of a command to start the application (the Ticket Gate Application Start command in FIG. 11A), for example, based on an operation on the user interface unit 103. The control unit 100 provides the second wireless communication unit 102 with a command to transmit a signal (Touch Info in FIG. 11A). Touch Info includes an SSID, a reservation ID, and the MAC address of the first wireless communication unit 101.

Moreover, the control unit 100 provides the first wireless communication unit 101 with a command to wait for the Probe Response frame for a specific period and to notify the control unit 100 of the information in the Probe Response frame (Scan Enable in FIG. 11A). The control unit 100 sets the maximum time for waiting for the Probe Response frame in the timer (T_AppEnd in FIG. 11A), and shifts to the Touch Wait state (ST902).

Figure 11B:
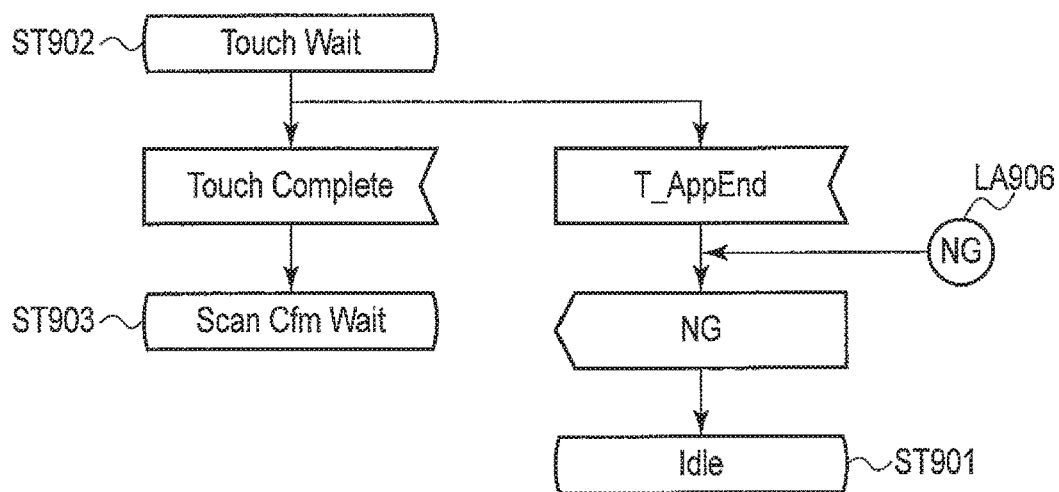
FIG. 11B is a diagram illustrating operation of the control unit of the wireless communication apparatus according to the second embodiment.

FIG. 11B shows inputs to and outputs from the control unit 100 during a transition of the control unit 100 from the Touch Wait state (ST902) to the Scan Cfm Wait state (ST903) or the Idle state (ST901). Moreover, FIG. 11B shows an output from the control unit 100 during a transition of the control unit 100 from the NG label (LA906) to the Idle state (ST901).

In the Touch Wait state (ST902), the control unit 100 waits to be notified, by the second wireless communication unit 102, of information indicating that the communication of Touch Info is completed (Touch Complete in FIG. 11B). When notified of Touch Complete, the control unit 100 shifts to the Scan Cfm Wait state (ST903).

At the NG label (LA906), the control unit 100 notifies the user of information indicative of authentication rejection on the application (NG in FIG. 11B) via the user interface unit 103 and then shifts to the Idle state (ST901). If the timer (T_AppEnd in FIG. 11B) times out without notification of Touch Complete, the control unit 100 performs an operation that is the same as or similar to the operation performed at the NG label (LA906).

Figure 11C:
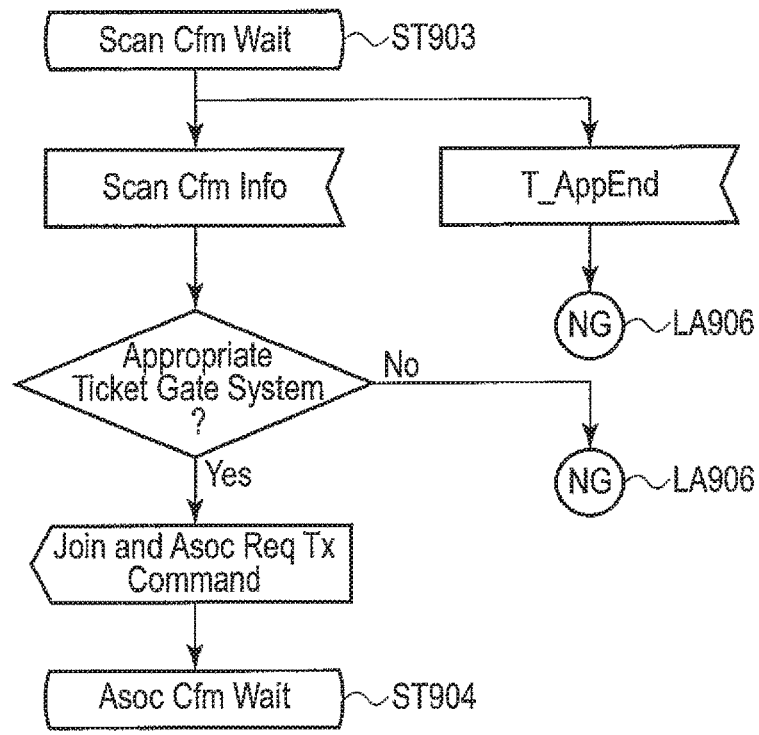
FIG. 11C is a diagram illustrating operation of the control unit of the wireless communication apparatus according to the second embodiment.

FIG. 11C shows inputs to and outputs from the control unit 100 during a transition of the control unit 100 from the Scan Cfm Wait state (ST903) to the Asoc Cfm Wait state (ST904) or the NG label (LA906).

In the Scan Cfm Wait state (ST903), the control unit 100 waits to be notified of the information (Scan Cfm Info in FIG. 11C) in the Probe Response frame by the first wireless communication unit 101.

When notified of Scan Cfm Info, the control unit 100 determines whether or not the Probe Response frame has been transmitted by the appropriate access point (authentication apparatus 20). If the Probe Response frame has been transmitted by the appropriate access point, the control unit 100 provides the first wireless communication unit 101 with commands to synchronize with a BSS specified by a BSSID equal to the MAC address of the access point and to transmit the Association Request frame to the access point (the Join and Asoc Req Tx command in FIG. 11C). The control unit 100 then shifts to the Asoc Cfm Wait state (ST904).

On the other hand, if the Probe Response frame has not been received from the appropriate access point, then the control unit 100 shifts to the NG label (LA906). Furthermore, if the timer (T_AppEnd) times out without notification of Scan Cfm Info from the first wireless communication unit 101, the control unit 200 shifts to the NG label (LA906).

Figure 11D:
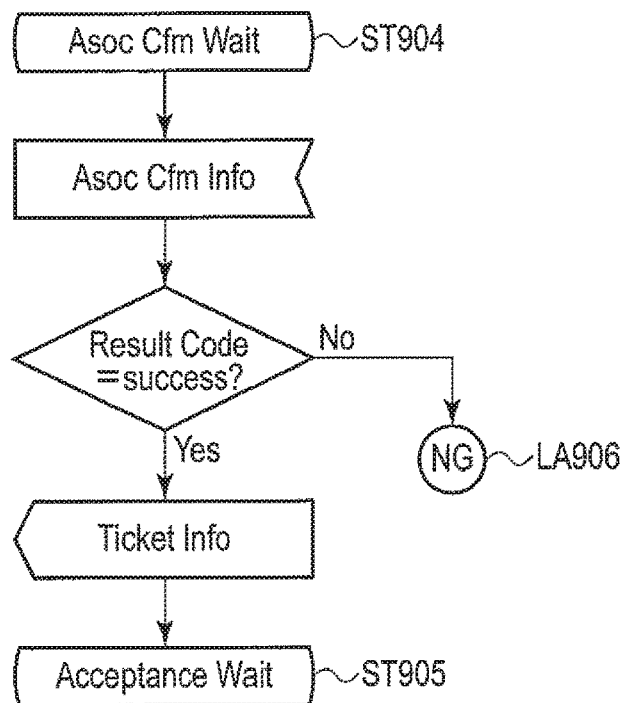
FIG. 11D is a diagram illustrating operation of the control unit of the wireless communication apparatus according to the second embodiment.

FIG. 11D shows inputs to and outputs from the control unit 100 during a transition of the control unit 100 from the Asoc Cfm Wait state (ST904) to the Acceptance Wait state (ST905) or the NG label (LA906). FIG. 11D illustrates an operation that is the same as or similar to the operation illustrated above with reference to FIG. 6C, FIG. 7D, and FIG. 10C and will thus not be described below.

Figure 11E:
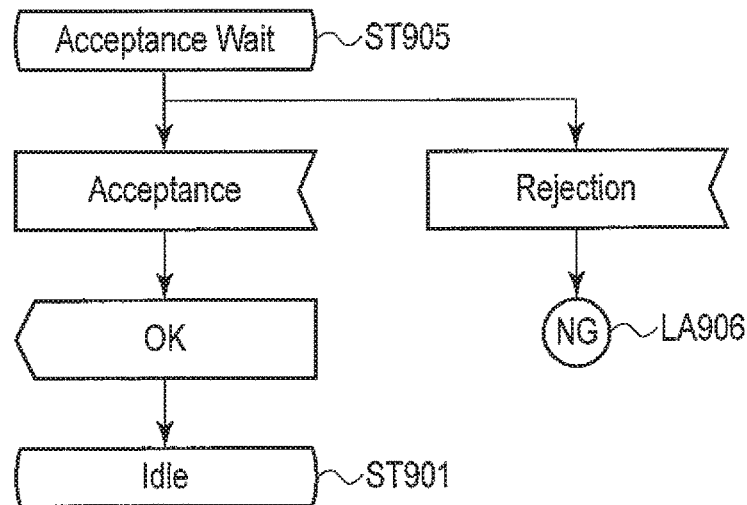
FIG. 11E is a diagram illustrating operation of the control unit of the wireless communication apparatus according to the second embodiment.

FIG. 11E shows inputs to and outputs from the control unit 100 during a transition of the control unit 100 from the Acceptance Wait state (ST905) to the Idle state (ST901) or the NG label (LA906). FIG. 11E illustrates an operation that is the same as or similar to the operation illustrated above with reference to FIG. 6D, FIG. 7E, and FIG. 10D, and will thus not be described below.

Figure 12A:
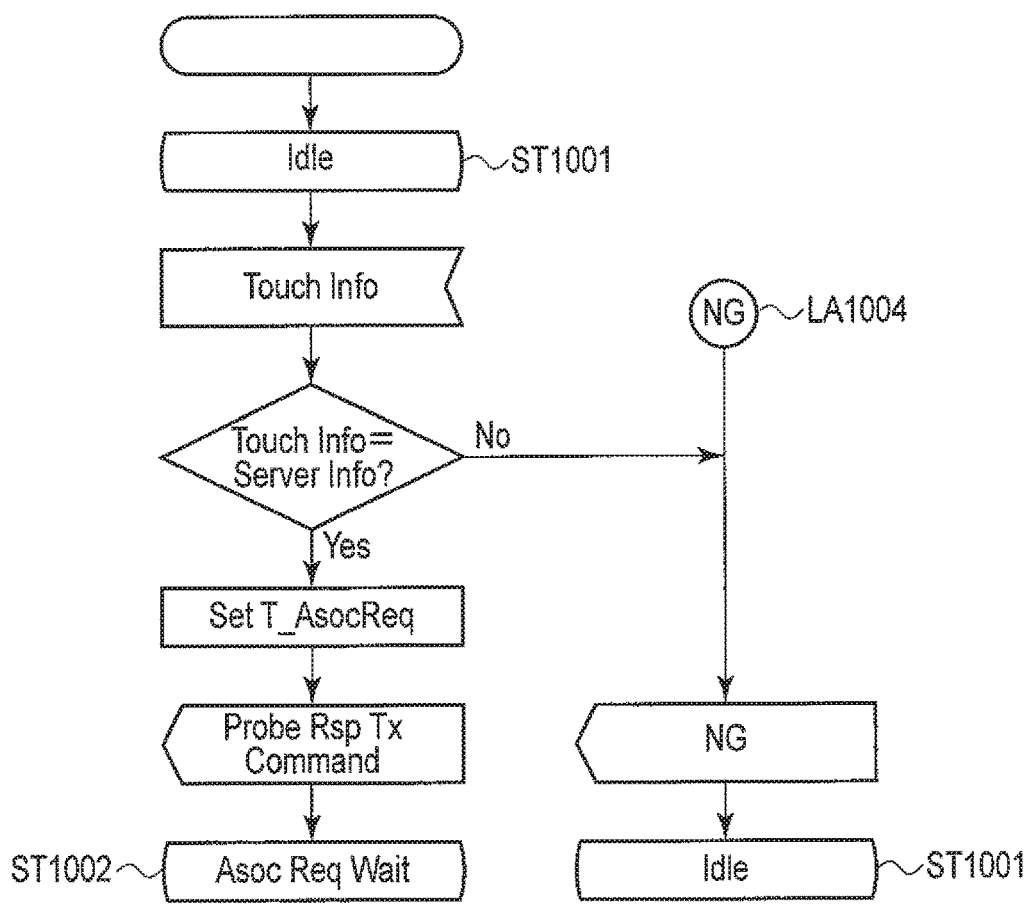
FIG. 12A is a diagram illustrating operation of a control unit of the authentication apparatus according to the second embodiment.
Figure 12B:
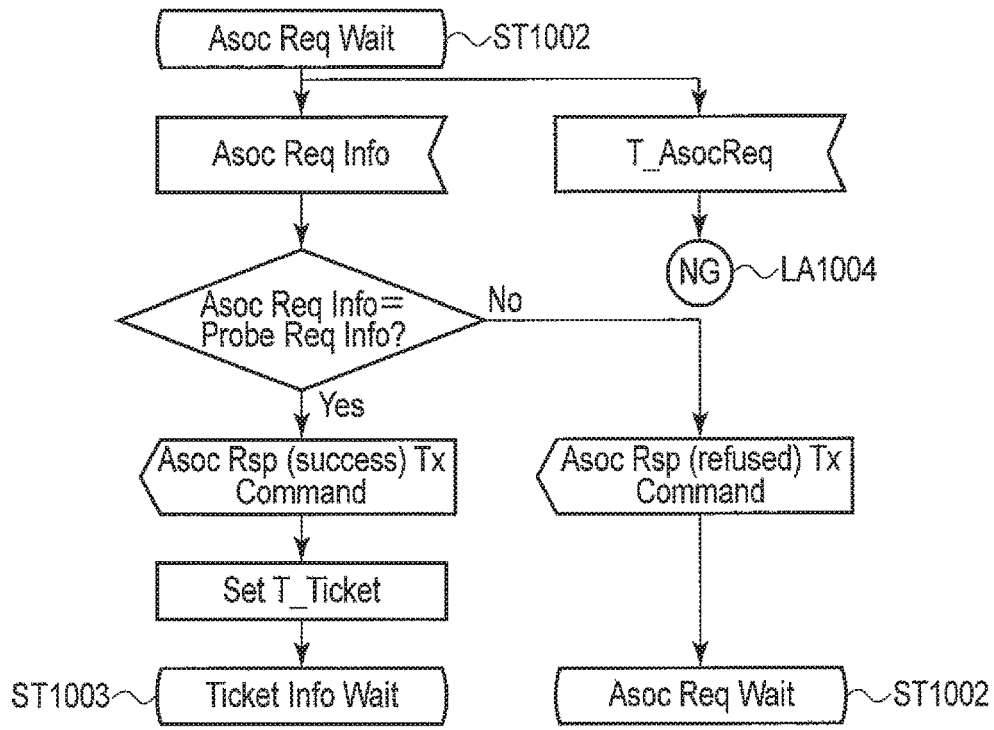
FIG. 12B is a diagram illustrating operation of the control unit of the authentication apparatus according to the second embodiment.
Figure 12C:
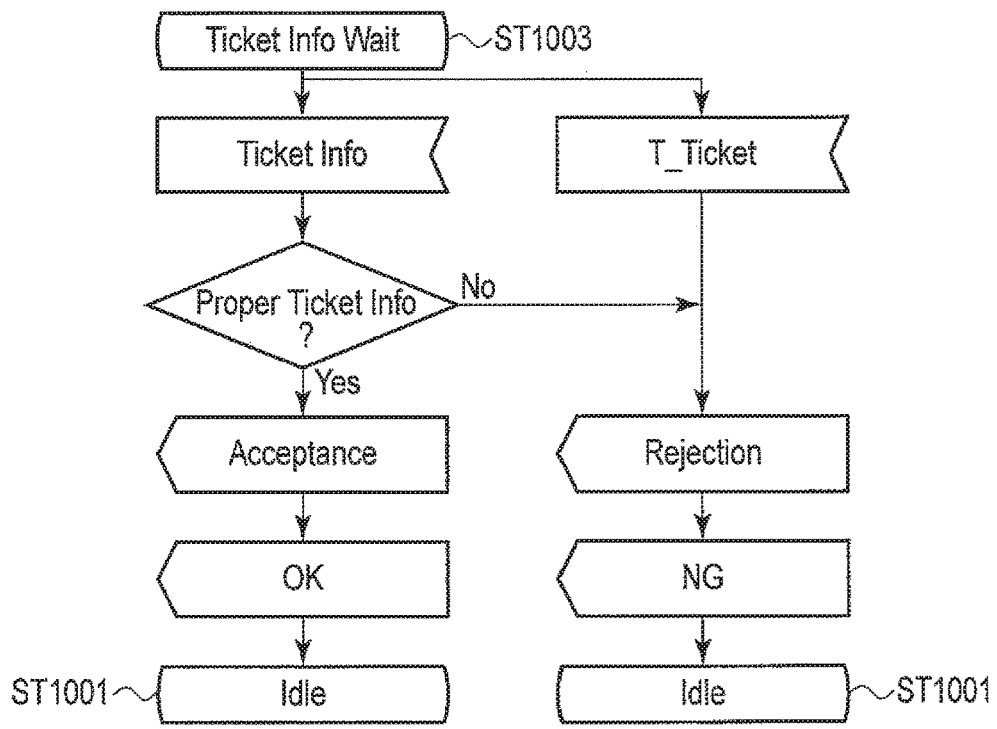
FIG. 12C is a diagram illustrating operation of the control unit of the authentication apparatus according to the second embodiment.

The details of operation of the control unit 200 provided in the wireless communication apparatus 20 according to the present embodiment can be described using the SDL as illustrated in FIG. 12A, FIG. 12B, and FIG. 12C.

In the description below, it is assumed that the terminal management entity provided in the control unit 200 gives commands to the MAC sublayer management entity to allow the first wireless communication unit 201 to be controlled.

FIG. 12A shows inputs to and outputs from the control unit 200 and internal processing by the control unit 200 during a transition of the control unit 200 from the Idle state (ST1001) to the Asoc Req Wait state (ST1002) or the Idle state (ST1001). Moreover, FIG. 12A shows an output from the control unit 200 during a transition of the control unit 200 from the NG label (LA1004) to the Idle state (ST1001).

In the Idle state (ST1001), for example, the control unit 200 is notified, by the second wireless communication unit 202, of the information in the signal received by the second wireless communication unit 202 (Touch Info in FIG. 12A). Touch Info includes an SSID, a reservation ID, and the MAC address of the first wireless communication unit 101.

The control unit 200 determines whether or not Touch Info matches information acquired from the server 30 (Server Info). If Touch Info matches Server Info, the control unit 200 sets the maximum time for waiting for the Association Request frame, in the timer (T_AsocReq in FIG. 12A). Moreover, the control unit 200 provides the first wireless communication unit 201 with a command to transmit the Probe Response frame to the desired wireless communication apparatus 10 (the Probe Rsp Tx command in FIG. 12A). The control unit 200 then shifts to the Asoc Req Wait state (ST1002).

At the NG label (LA1004), the control unit 200 notifies the user of information indicative of authentication rejection on the application (NG in FIG. 12A) via the user interface unit 203 and then shifts to the Idle state (ST1001). For example, the user interface unit 203 closes the flap door and displays an image indicating that passage is rejected. If Touch Info fails to match Server Info, the control unit 200 performs an operation that is the same as or similar to the operation performed at the NG label (LA1004). Moreover, the control unit 200 may perform an operation that is the same as or similar to the operation performed at the NG label (LA1004) if passage of a human being is detected without notification of Touch Info.

FIG. 12B shows inputs to and outputs from the control unit 200 and internal processing by the control unit 200 during a transition of the control unit 200 from the Asoc Req Wait state (ST1002) to the Ticket Info Wait state (ST1003), the Asoc Req Wait state (ST1002), or the NG label (LA1004). FIG. 12B illustrates an operation that is the same as or similar to the operation illustrated in FIG. 8C described above, and will thus not be described below.

FIG. 12C shows inputs to and outputs from the control unit 200 during a transition of the control unit 200 from the Ticket Info Wait state (ST1003) to the Idle state (ST1001). FIG. 12C illustrates an operation that is the same as or similar to the operation illustrated in FIG. 8D described above, and will thus not be described below.

Third Embodiment

A wireless communication apparatus and an authentication apparatus according to a third embodiment are basically the same as or similar to the wireless communication apparatus and authentication apparatus according to the second embodiment except that the wireless communication apparatus does not omit the transmission of a Probe Request frame. According to the present embodiment, the authentication apparatus 20 is the same as or similar to the authentication apparatus 20 according to the second embodiment. That is, the authentication apparatus 20 transmits a Probe Response frame in accordance with the signal in FIG. 9 (S701) instead of the Probe Request frame.

According to the present embodiment, a wireless communication apparatus 10 can operate in accordance with the regular IEEE 802.11 wireless LAN standard. Hence, an implementation load on the wireless communication apparatus 10 can be reduced.

The details of operation of the control unit 100 provided in the wireless communication apparatus 10 according to the present embodiment can be described using the SDL. Specifically, the operation of the control unit 100 is the same as or similar to the example of operation in FIG. 6A, FIG. 6B, FIG. 6C, and FIG. 6D or the example of operation in FIG. 7A, FIG. 7B, FIG. 7C, FIG. 7D, and FIG. 7E.

The details of operation of the control unit 200 provided in the wireless communication apparatus 20 according to the present embodiment can be described using the SDL. Specifically, the operation of the control unit 200 is the same as or similar to the operation illustrated in FIG. 12A, FIG. 12B, and FIG. 12C.

Fourth Embodiment

A wireless communication apparatus and an authentication apparatus according to a fourth embodiment are basically the same as or similar to the wireless communication apparatus and authentication apparatus according to the second embodiment except that the authentication apparatus transmits a signal replacing the Probe Response frame, based on the second wireless communication scheme.

Specifically, according to the present embodiment, the control unit 200, when notified of the information in the signal in FIG. 9 (S701) by the second wireless communication unit 202, provides the second wireless communication unit 202 with a command to transmit the signal.

The signal replaces the Probe Response frame (S702) in FIG. 9 and contains information that is the same as or similar to the information in the Probe Response frame (S702). For example, the signal contains the MAC address of the first wireless communication unit 201. As described above, the MAC address of the first wireless communication unit 201 is equal to a BSSID. Furthermore, the above-described transmitted signal may contain an SSID. The control unit 100 may determine whether or not the SSID is appropriate.

If the second wireless communication scheme is communication using a contact IC card or a noncontact IC card or NFC, which enables the communication partner to be uniquely identified, the destination address (for example, the MAC address of the first wireless communication unit 101) can be omitted from the above-described signal.

The second wireless communication unit 102 receives the signal replacing the Probe Response frame in FIG. 9 (S702), and notifies the control unit 100 of the information in the received signal. Based on the MAC address of the first wireless communication unit 201 contained in the received signal, the control unit 100 provides the first wireless communication unit 101 with a command to transmit the Association Request frame (corresponding to the Association Request frame in FIG. 9 (S703)).

The details of operation of the control unit 100 provided in the wireless communication apparatus 10 according to the present embodiment can be described using the SDL. Specifically, the operation of the control unit 100 is basically the same as or similar to the example of operation in FIG. 10A, FIG. 10B, FIG. 10C, and FIG. 10D or the example of operation in FIG. 11A, FIG. 11B, FIG. 11C, FIG. 11D, and FIG. 11E, but is different from these examples in parts of the operation illustrated in FIG. 10B and FIG. 11B. The control unit 100 is notified of the information (which can be referred to as, for example, Touch Reply Info) in the signal received by the second wireless communication unit 102 instead of Scan Cfm Info. Touch Reply Info includes the MAC address of the first wireless communication unit 201.

The details of operation of the control unit 200 provided in the authentication apparatus 20 according to the present embodiment can be described using the SDL. Specifically, the operation of the control unit 200 is basically the same as or similar to the example of operation in FIG. 12A, FIG. 12B, and FIG. 12C, but is different from the example in a part of the operation illustrated in FIG. 12A. The control unit 200 provides the second wireless communication unit 202 with a command to transmit a signal (Touch Reply Info) instead of the Probe Rsp Tx command. Touch Reply Info includes the MAC address of the first wireless communication unit 201.

According to the present embodiment, the setting of security can be completed by the time connection is completed by containing information required to set the security in signals exchanged between the wireless communication apparatus 10 and the authentication apparatus 20. For example, the signal replacing the Probe Response frame in FIG. 9 (S702) may contain an encryption key used by the first wireless communication unit 201 after the connection is completed.

Fifth Embodiment

In the above-described embodiments, the authentication apparatus 20 is assumed to be an automatic ticket gate. However, the authentication apparatus 20 may be an access point that permits the wireless communication apparatus 10 to make limited use of the communication (which is hereinafter assumed to be wireless LAN communication for simplification) based on the first wireless communication scheme in a certain place.

According to the above-described embodiments, when the wireless communication apparatus 10 transmits a signal based on the second wireless communication scheme, the authentication apparatus 20 carries out a series of authentication processes. During these processes, the wireless communication apparatus 10 connects to the authentication apparatus 20 via the wireless LAN. The authentication apparatus 20 according to the present embodiment permits the wireless communication apparatus 10 accepted through the series of authentication processes to utilize wireless LAN communication (for example, Internet connection, contents distribution, or advertisement distribution).

The elements of the authentication apparatus 20 need not be provided in the same apparatus. For example, the first wireless communication unit 201 may be provided in an apparatus different from the apparatus in which the second wireless communication unit 202 is provided. However, the different apparatuses are connected together, for example, by cable to carry out a series of authentication processes as is the case with the above-described embodiments. If the elements of the authentication apparatus 20 are distributed among a plurality of apparatuses, the authentication apparatus 20 may be referred to as an authentication system.

For example, an apparatus comprising the second wireless communication unit 202 is disposed at an entrance of a certain place (for example, a wireless LAN area provided by the authentication apparatus 20). The user of the wireless communication apparatus 10 allows the second wireless communication unit 102 to transmit a signal by, for example, executing a certain application. The second wireless communication unit 202 receives the signal, and the authentication apparatus 20 carries out a series of authentication processes. If the wireless communication apparatus 10 has an appropriate authority, the wireless communication apparatus 10 is permitted to utilize the wireless LAN communication. On the other hand, if the wireless communication apparatus 10 fails to have an appropriate authority, the wireless communication apparatus 10 is not permitted to utilize the wireless LAN communication.

The present embodiment can implement an access point that permits the wireless communication apparatus to make limited use of the communication based on the first wireless communication scheme in a certain place.

Sixth Embodiment

A wireless communication apparatus and an authentication apparatus according to a sixth embodiment are basically the same as or similar to the wireless communication apparatus and authentication apparatus according to any of the above-described embodiments, but further comprise a buffer for the communication based on the first wireless communication scheme.

For example, the wireless communication apparatus 10 in FIG. 1 may comprise a buffer in the first wireless communication unit 101 or in the memory (not shown in the drawings) used by the first wireless communication unit 101. Furthermore, the authentication apparatus 20 in FIG. 2 may comprise a buffer in the first wireless communication unit 201 or in the memory (not shown in the drawings) used by the first wireless communication unit 201.

Provision of such a buffer enables signals transmitted and received based on the first wireless communication scheme to be saved. That is, for example, a process of retransmitting the signals and a process of outputting the signals to the exterior can be easily implemented.

Furthermore, the wireless communication apparatus and authentication apparatus according to the present embodiment may further comprise a buffer for communication based on the communication based on the second wireless communication scheme. For example, the wireless communication apparatus 10 in FIG. 1 may comprise a buffer in the second wireless communication unit 102 or in the memory (not shown in the drawings) used by the second wireless communication unit 102. Furthermore, the authentication apparatus 20 in FIG. 2 may comprise a buffer in the second wireless communication unit 202 or in the memory (not shown in the drawings) used by the second wireless communication unit 202.

Provision of such a buffer enables signals transmitted and received based on the second wireless communication scheme to be saved. That is, for example, a process of retransmitting the signals and a process of outputting the signals to the exterior can be easily implemented.

Seventh Embodiment

A wireless communication apparatus and an authentication apparatus according to a seventh embodiment are basically the same as or similar to the wireless communication apparatus and authentication apparatus according to any of the above-described embodiments except that firmware runs in the control unit. The present embodiment allows wireless communication functions to be easily changed by rewriting the firmware.

Eighth Embodiment

A wireless communication apparatus and an authentication apparatus according to an eighth embodiment are basically the same as or similar to the wireless communication apparatus and authentication apparatus according to any of the above-described embodiments except that the first wireless communication unit further comprises a clock generation unit that generates a clock signal. The control unit operates based on the clock signal from the clock generation unit.

Specifically, in the wireless communication apparatus 10 in FIG. 1, the first wireless communication unit 101 comprises a clock generation unit, and the control unit 100 operates based on a clock signal from the clock generation unit. Furthermore, in the authentication apparatus 20 in FIG. 2, the first wireless communication unit 201 comprises a clock generation unit, and the control unit 200 operates based on a clock signal from the clock generation unit.

The control unit can operate in synchronism with the first wireless communication unit by operating based on the clock signal generated by the first wireless communication unit.

Furthermore, in the wireless communication apparatus and authentication apparatus according to the present embodiment, the second wireless communication unit may operate based on the clock signal from the clock generation unit in the first wireless communication unit. That is, in the wireless communication apparatus 10 in FIG. 1, the second wireless communication unit 102 may operate based on the clock signal from the clock generation unit in the first wireless communication unit 101. In the authentication apparatus 20 in FIG. 2, the second wireless communication unit 202 may operate based on the clock signal from the clock generation unit in the first wireless communication unit 201.

The second wireless communication unit can operate in synchronism with the first wireless communication unit by operating based on the clock signal generated by the first wireless communication unit.

Ninth Embodiment

A wireless communication apparatus and an authentication apparatus according to a ninth embodiment are basically the same as or similar to the wireless communication apparatus and authentication apparatus according to any of the above-described embodiments, but further comprise a power supply unit, a power supply control unit, and a wireless power feeding unit. The power supply control unit is connected to the power supply unit and the wireless power feeding unit, and selects one of the power supply unit and the wireless power feeding unit as a power supply for the apparatus. The present embodiment appropriately controls the power supply for the apparatus to enable operation with reduced power consumption.

Tenth Embodiment

A wireless communication apparatus and an authentication apparatus according to a tenth embodiment are basically the same as or similar to the wireless communication apparatus and authentication apparatus according to any of the above-described embodiments, but further comprise a moving image compression/decompression unit. The present embodiment can facilitate transmission of compressed moving images and decompression of received compressed moving images.

Eleventh Embodiment

A wireless communication apparatus and an authentication apparatus according to an eleventh embodiment are basically the same as or similar to the wireless communication apparatus and authentication apparatus according to any of the above-described embodiments except that the first wireless communication unit further comprises an LED (Light Emitting Diode) unit or another lighting element. The LED unit lights in a pattern corresponding to the operational status of the first wireless communication unit. Thus, the user can be easily notified of the operational status of the first wireless communication unit.

Furthermore, the second wireless communication unit may further comprise an LED unit or another lighting element. The LED unit lights in a pattern corresponding to the operational status of the second wireless communication unit. Thus, the user can be easily notified of the operational status of the second wireless communication unit.

Twelfth Embodiment

A wireless communication apparatus and an authentication apparatus according to a twelfth embodiment are basically the same as or similar to the wireless communication apparatus and authentication apparatus according to any of the above-described embodiments, but further comprise a vibrator unit connected to the first wireless communication unit. The vibrator unit vibrates in a pattern corresponding to the operational status of the first wireless communication unit. Thus, the user can be easily notified of the operational status of the first wireless communication unit.

Furthermore, the wireless communication apparatus and authentication apparatus according to the present embodiment comprise a vibrator unit connected to the second wireless communication unit. The vibrator unit vibrates in a pattern corresponding to the operational status of the second wireless communication unit. Thus, the user can be easily notified of the operational status of the second wireless communication unit.

Thirteenth Embodiment

A wireless communication apparatus and an authentication apparatus according to a thirteenth embodiment are basically the same as or similar to the wireless communication apparatus and authentication apparatus according to any of the above-described embodiments except that the first wireless communication unit comprises a switching unit and a plurality of different PHY processing units. The switching unit is connected to the plurality of PHY processing units to switch an effective PHY processing unit. The present embodiment can perform the communication based on the first wireless communication scheme using the appropriate PHY processing unit according to the situation.

Fourteenth Embodiment

A wireless communication apparatus and an authentication apparatus according to a fourteenth embodiment are basically the same as or similar to the wireless communication apparatus and authentication apparatus according to any of the above-described embodiments except that the first wireless communication unit comprises a switching unit and a plurality of different wireless communication functional units (including a PHY processing unit). For example, one of the plurality of wireless communication functional units may be a functional unit that performs the wireless LAN communication. The switching unit is connected to the plurality of wireless communication functional units to switch an effective wireless communication functional unit. The present embodiment can perform the communication based on the first wireless communication scheme using the appropriate wireless communication functional unit according to the situation.

Fifteenth Embodiment

A wireless communication apparatus and an authentication apparatus according to a fifteenth embodiment are basically the same as or similar to the wireless communication apparatus and authentication apparatus described in the thirteenth embodiment but further comprise a switch. The switch connects the effective PHY processing unit to the antenna. The present embodiment can perform the communication based on the first wireless communication scheme using the appropriate PHY processing unit according to the situation while sharing the antenna.

Sixteenth Embodiment

A wireless communication apparatus and an authentication apparatus according to a sixteenth embodiment are basically the same as or similar to the wireless communication apparatus and authentication apparatus described in the fourteenth embodiment but further comprise a switch. The switch connects the effective wireless communication functional unit to the antenna. The present embodiment can perform the communication based on the first wireless communication scheme using the appropriate wireless communication functional unit according to the situation while sharing the antenna.

The processing in the above-described embodiments can be implemented using a general-purpose computer as basic hardware. A program implementing the processing in each of the above-described embodiments may be stored in a computer readable storage medium for provision. The program is stored in the storage medium as a file in an installable or executable format. The storage medium is a magnetic disk, an optical disc (CD-ROM, CD-R, DVD, or the like), a magnetooptic disc (MO or the like), a semiconductor memory, or the like. That is, the storage medium may be in any format provided that a program can be stored in the storage medium and that a computer can read the program from the storage medium. Furthermore, the program implementing the processing in each of the above-described embodiments may be stored on a computer (server) connected to a network such as the Internet so as to be downloaded into a computer (client) via the network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus, comprising:
   first wireless communication circuitry configured to communicate with a first electronic apparatus via a first wireless signal conforming to a wireless LAN standard, wherein a first address is assigned to the first wireless communication circuitry; and
   second wireless communication circuitry configured to receive a second wireless signal conforming to a standard of near field communication and notifying information used to set security for communication via the first wireless communication circuitry;
   wherein the first wireless communication circuitry is further configured to:
      transmit an association request frame comprising the first address in a source address field and a second address assigned to the first electronic apparatus in a destination address field to the first electronic apparatus after reception of the information via the second wireless communication circuitry;
      receive an association response frame comprising a status code from the first electronic apparatus; and
      transmit a data frame to the first electronic apparatus, if the status code of the association response frame indicates a success.

2. The electronic apparatus of claim 1, wherein the second wireless communication circuitry is further configured to receive the second address, and the first wireless communication circuitry is further configured to transmit the association request frame after reception of the information and the second address via the second wireless communication circuitry.

3. An electronic apparatus, comprising:
   wireless communication circuitry configured to communicate with a first electronic apparatus via a wireless signal conforming to a wireless LAN standard, wherein a first address is assigned to the wireless communication circuitry; and
   reception circuitry configured to receive a signal of an image of a two dimensional bar code captured by a camera, the two dimensional bar code comprising information used to set security for communication via the wireless communication circuitry,
   wherein the wireless communication circuitry is further configured to:
      transmit an association request frame comprising the first address in a source address field and a second address assigned to the first electronic apparatus in a destination address field to the first electronic apparatus after reception of the signal of the image via the reception circuitry;
      receive an association response frame comprising a status code from the first electronic apparatus; and transmit a data frame to the first electronic apparatus, if the status code of the association response frame indicates a success.

4. The electronic apparatus of claim 3, wherein the two dimensional bar code further comprises information of the second address, and the wireless communication circuitry is further configured to transmit the association request frame after reception of the information and the second address via the reception circuitry.

5. The electronic apparatus of claim 3, wherein the two dimensional bar code comprises a quick response (QR) code.

6. A system, comprising:
first wireless communication circuitry configured to communicate with a first electronic apparatus via a first wireless signal conforming to a wireless LAN standard, wherein a first address is assigned to the first wireless communication circuitry; and
second wireless communication circuitry configured to transmit a second wireless signal conforming to a standard of near field communication and notifying information used to set security for communication via the first wireless communication circuitry;
wherein the first wireless communication circuitry is further configured to:
receive an association request frame comprising the first address in a destination address field from the first electronic apparatus after transmission of the information via the second wireless communication circuitry;
transmit an association response frame comprising a status code to the first electronic apparatus after reception of the association request frame; and
receive a data frame from the first electronic apparatus, if the status code of the association response frame indicates a success.

7. The system of claim 6, wherein the second wireless communication circuitry is further configured to transmit the first address, and the first wireless communication circuitry is further configured to receive the association request frame after transmission of the information and the first address via the second wireless communication circuitry.

8. A system, comprising:
wireless communication circuitry configured to communicate with a first electronic apparatus via a wireless signal conforming to a wireless LAN standard, wherein a first address is assigned to the wireless communication circuitry; and
a display configured to display an image of a two dimensional bar code, the two dimensional bar code comprising information used to set security for communication via the wireless communication circuitry,
wherein the wireless communication circuitry is further configured to:
receive an association request frame comprising the first address in a destination address field from the first electronic apparatus after initiation of displaying of the image of the two dimensional bar code on the display;
transmit an association response frame comprising a status code to the first electronic apparatus after reception of the association request frame; and
receive a data frame from the first electronic apparatus, if the status code of the association response frame indicates a success.

9. The system of claim 8, wherein the two dimensional bar code further comprises information of the first address.

10. The system of claim 8, wherein the two dimensional bar code comprises a quick response (QR) code.

11. A method performed by using first wireless communication circuitry conforming to a wireless LAN standard and second wireless communication circuitry conforming to a standard of near field communication, comprising:
receiving, via the second wireless communication circuitry, a wireless signal conforming to the standard of near field communication and notifying information used to set security for communication via the first wireless communication circuitry;
transmitting, via the first wireless communication circuitry, an association request frame comprising a first address assigned to the first wireless communication circuitry in a source address field and a second address assigned to the first electronic apparatus in a destination address field to the first electronic apparatus after receiving the information via the second wireless communication circuitry;
receiving, via the first wireless communication circuitry, an association response frame comprising a status code from the first electronic apparatus; and
transmitting, via the first wireless communication circuitry, a data frame to the first electronic apparatus, if the status code of the association response frame indicates a success.

12. The method of claim 11, further comprising receiving the second address via the second wireless communication circuitry, wherein transmitting the association request frame via the first wireless communication circuitry is performed after receiving the information and the second address via the second wireless communication circuitry.

13. A method performed by using wireless communication circuitry conforming to a wireless LAN standard and reception circuitry, comprising:
receiving, via the reception circuitry, a signal of an image of a two dimensional bar code captured by a camera, the two dimensional bar code comprising information used to set security for communication via the wireless communication circuitry;
transmitting, via the wireless communication circuitry, an association request frame comprising a first address assigned to the wireless communication circuitry in a source address field and a second address assigned to the first electronic apparatus in a destination address field to the first electronic apparatus after receiving the signal of the image via the reception circuitry;
receiving, via the wireless communication circuitry, an association response frame comprising a status code from the first electronic apparatus; and
transmitting, via the wireless communication circuitry, a data frame to the first electronic apparatus, if the status code of the association response frame indicates a success.

14. The method of claim 13, wherein the two dimensional bar code further comprises information of the second address, and transmitting the association request frame via the wireless communication circuitry is performed after receiving the information and the second address via the reception circuitry.

15. The method of claim 13, wherein the two dimensional bar code comprises a quick response (QR) code.

16. A method performed by using first wireless communication circuitry conforming to a wireless LAN standard and second wireless communication circuitry conforming to a standard of near field communication, comprising:

transmitting, via the second wireless communication circuitry, a wireless signal conforming to the standard of near field communication and notifying information used to set security for communication via the first wireless communication circuitry;

receiving, via the first wireless communication circuitry, an association request frame comprising a first address assigned to the first wireless communication circuitry in a destination address field from the first electronic apparatus after transmitting the information via the second wireless communication circuitry;

transmitting, via the first wireless communication circuitry, an association response frame comprising a status code to the first electronic apparatus after reception of the association request frame; and receiving, via the first wireless communication circuitry, a data frame from the first electronic apparatus, if the status code of the association response frame indicates a success.

17. The method of claim 16 further comprising transmitting the first address via the second wireless communication circuitry, wherein receiving the association request frame via the first wireless communication circuitry is performed after transmitting the information and the first address via the second wireless communication circuitry.

18. A method performed by using a display and wireless communication circuitry conforming to a wireless LAN standard, comprising:

displaying, on the display, an image of a two dimensional bar code comprising information used to set security for communication via the wireless communication circuitry;

receiving, via the wireless communication circuitry, an association request frame comprising a first address assigned to the wireless communication circuitry in a destination address field from a first electronic apparatus after initiation of displaying the image of the two dimensional code on the display;

transmitting, via the wireless communication circuitry, an association response frame comprising a status code to the first electronic apparatus after receiving the association request frame; and receiving, via the wireless communication circuitry, a data frame from the first electronic apparatus, if the status code of the association response frame indicates a success.

19. The method of claim 18, wherein the two dimensional bar code further comprises information of the first address.

20. The method of claim 18, wherein the two dimensional bar code comprises a quick response (QR) code.

* * * * *